United States Patent [19]

Hudson

[11] 3,758,712

[45] Sept. 11, 1973

[54] DIGITAL SPECIAL EFFECTS GENERATOR

[75] Inventor: John P. Hudson, Toronto, Ontario, Canada

[73] Assignee: Sarkes Tarzian, Inc., Bloomington, Ind.

[22] Filed: Mar. 27, 1972

[21] Appl. No.: 238,077

[52] U.S. Cl. .............................. 178/6.8, 178/DIG. 6

[51] Int. Cl. .............................................. H04n 5/22

[58] Field of Search ......................... 178/DIG. 6, 6.8

[56] References Cited

UNITED STATES PATENTS

| | | | |
|---|---|---|---|
| 3,598,908 | 8/1971 | Poulett | 178/DIG. 6 |
| 3,671,667 | 6/1972 | Thorpe | 178/DIG. 6 |

*Primary Examiner*—Howard W. Britton
*Attorney*—Richard D. Mason et al.

[57] ABSTRACT

A special effects generator constructed primarily from digital hardware combines two input video signals into a single output video signal under the control of a single lever control. Horizontal, vertical, and diagonal wipes may be achieved, as well as exploding circular and elliptical wipes and many other highly unusual effects. The generator includes a horizontal digital counter the count output of which indicates the horizontal position of a scanning spot in the output video signal and a vertical digital counter the output of which indicates the vertical position of the scanning spot. An analog-to-digital converter presents a count proportional to the setting of the lever control. Digital computational circuitry including squaring circuitry is provided for processing these digital counts in various ways, and the resultant computed digital outputs are compared by one or more digital comparing circuits or comparators. The comparing circuit outputs then serve as a criterion for determining which of two input video signals is to be used in constructing the output video signal at any given moment.

8 Claims, 28 Drawing Figures

*DIGITAL SPECIAL EFFECTS GENERATOR*

Patented Sept. 11, 1973
3,758,712
20 Sheets-Sheet 1
FIG 1 DIGITAL SPECIAL EFFECTS GENERATOR
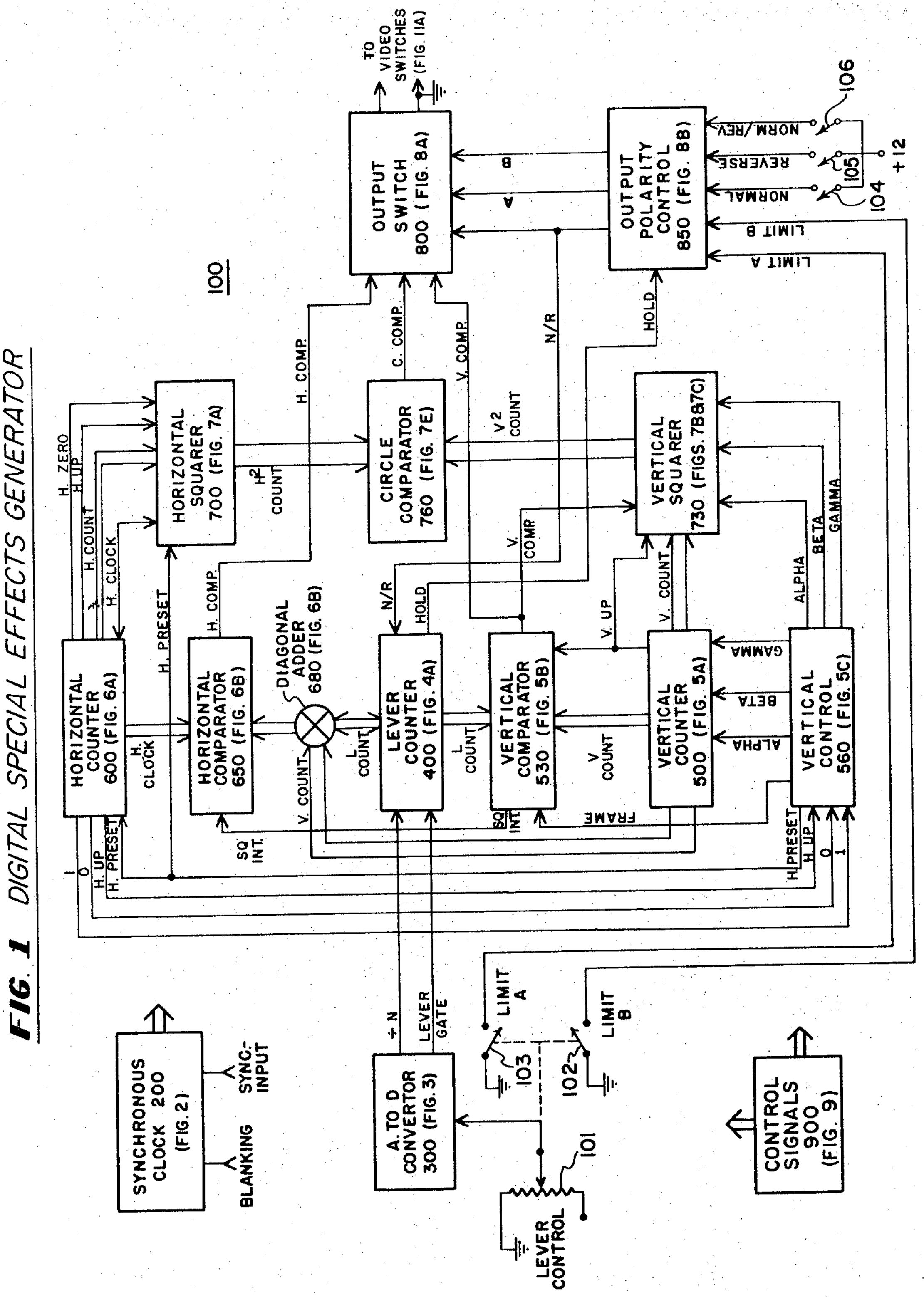

FIG. 2 SYNCHRONOUS CLOCK 200
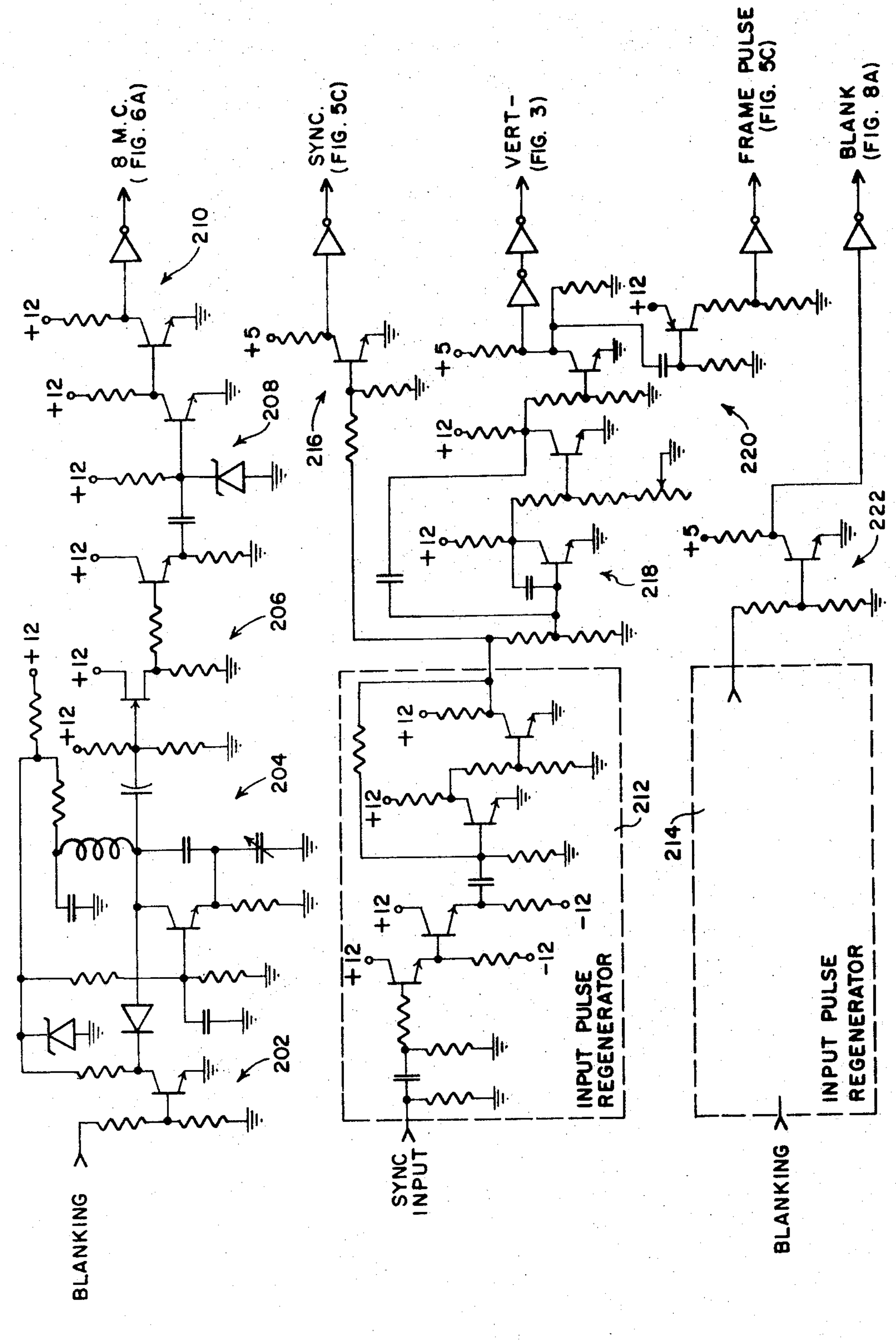

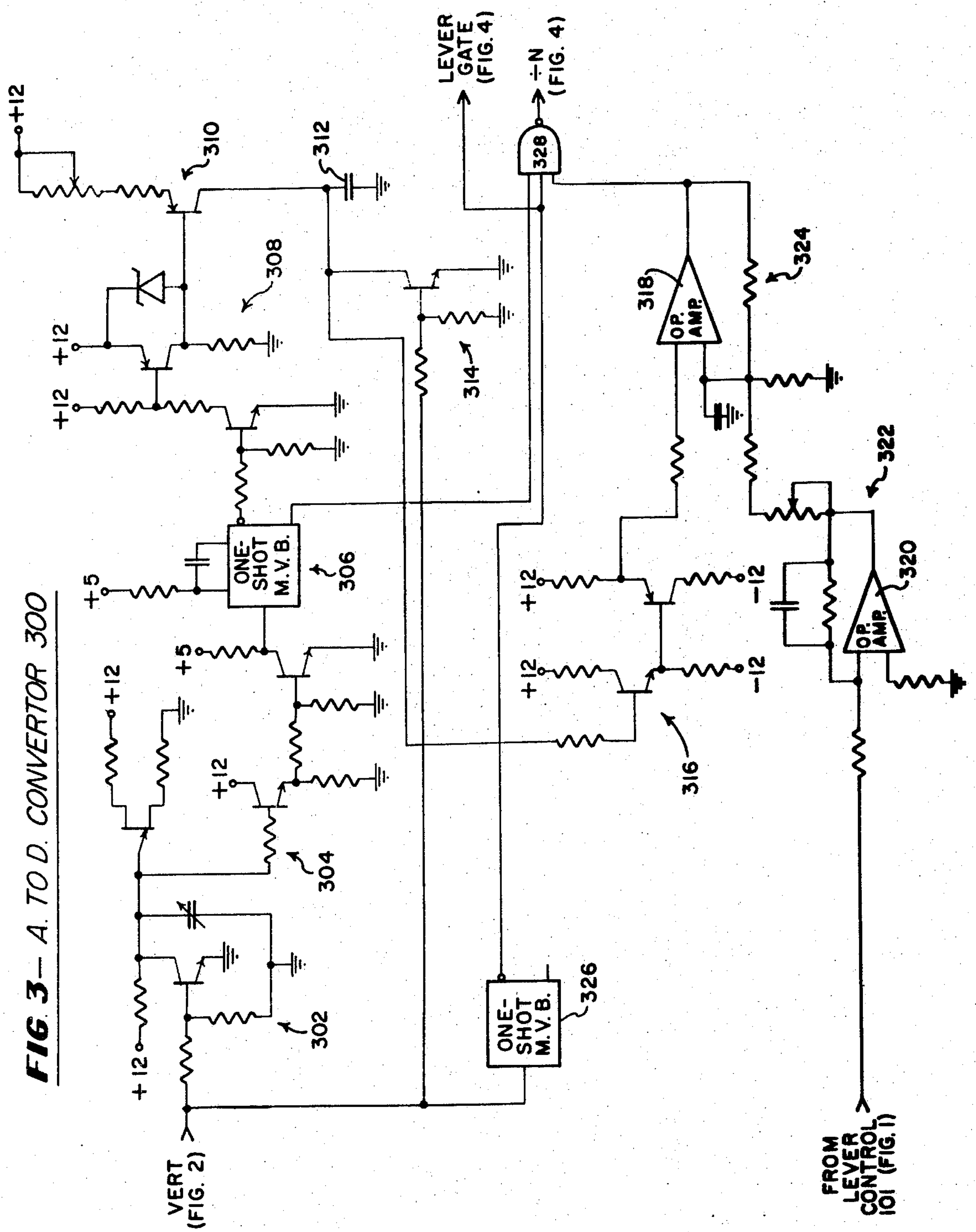
FIG. 3— A. TO D. CONVERTOR 300

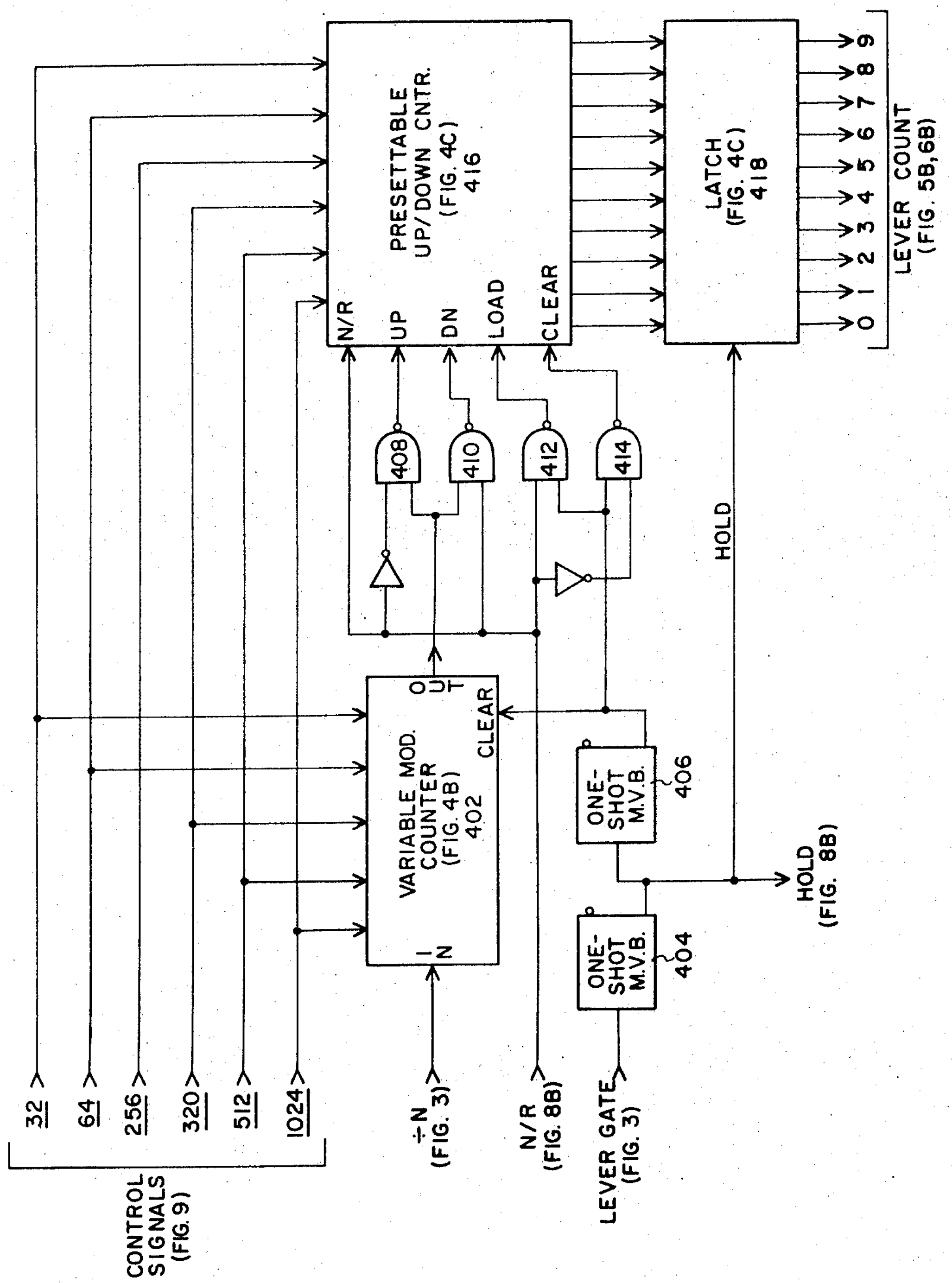
FIG. 4A - LEVER COUNTER 400

Patented Sept. 11, 1973 3,758,712
20 Sheets-Sheet 5
8
FIG.4B - VARIABLE MOD COUNTER 402
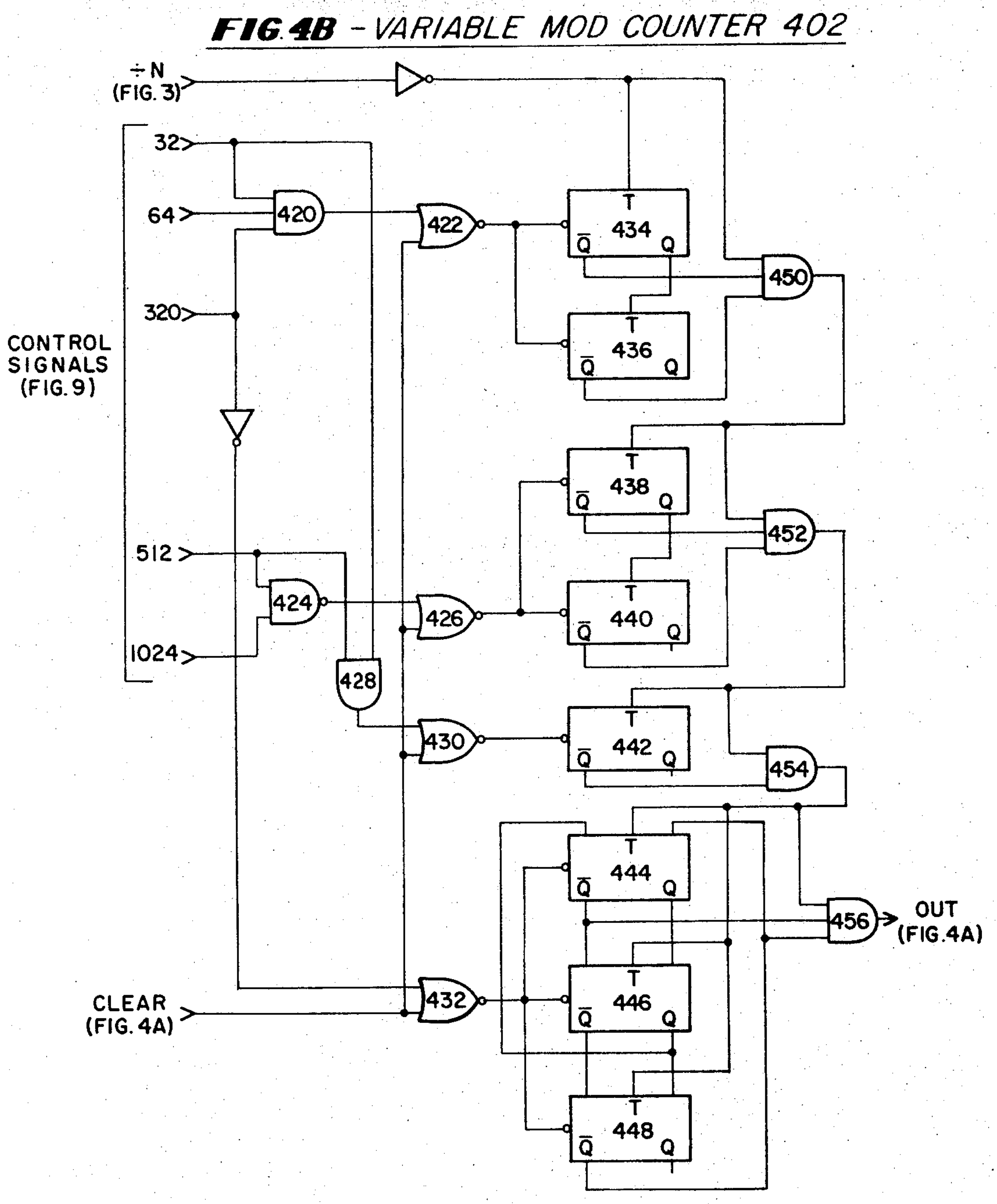

FIG. 4C-UP/DN. COUNTER 416 AND LATCH 418
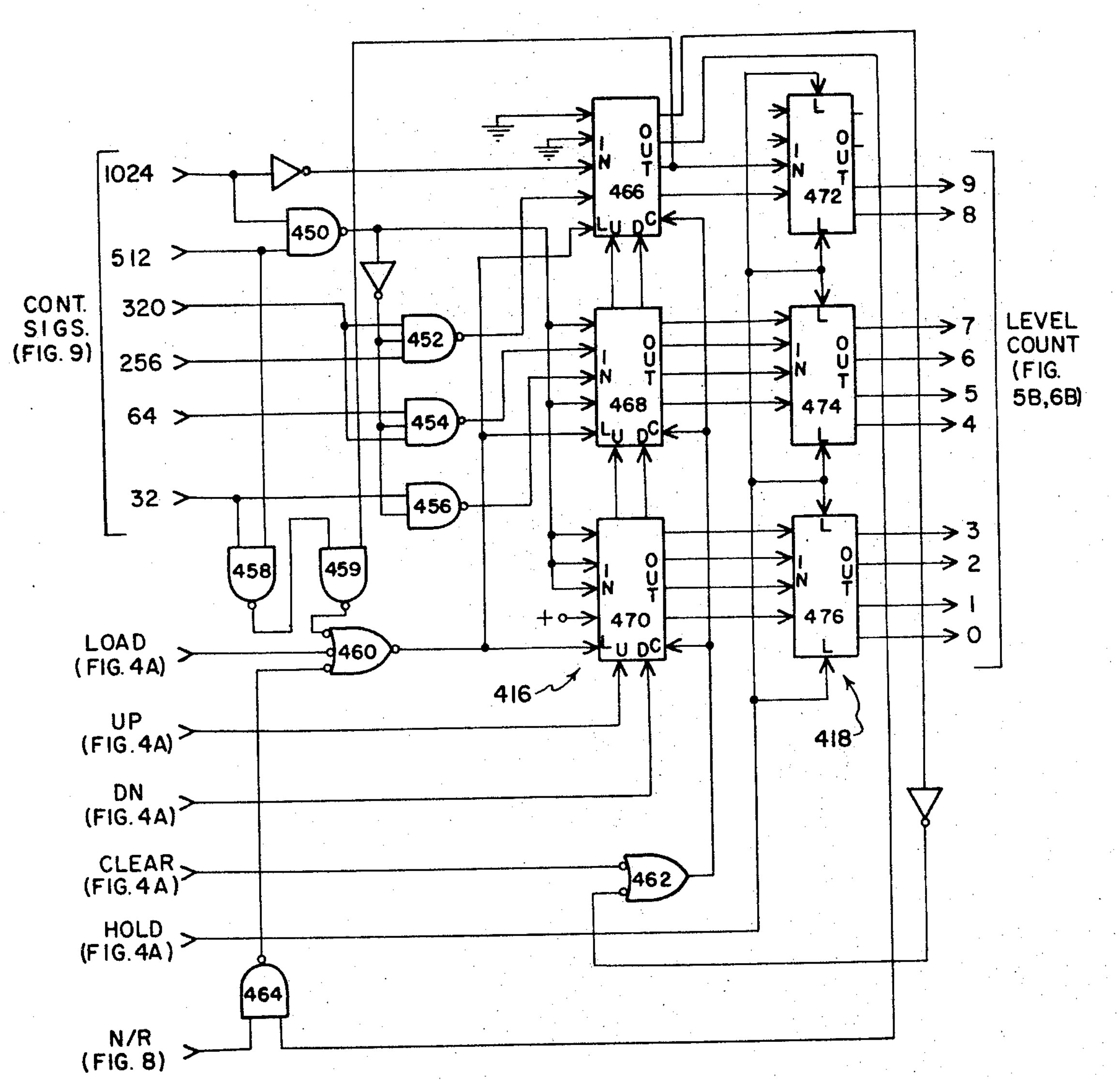

FIG. 5A - VERTICAL COUNTER 500
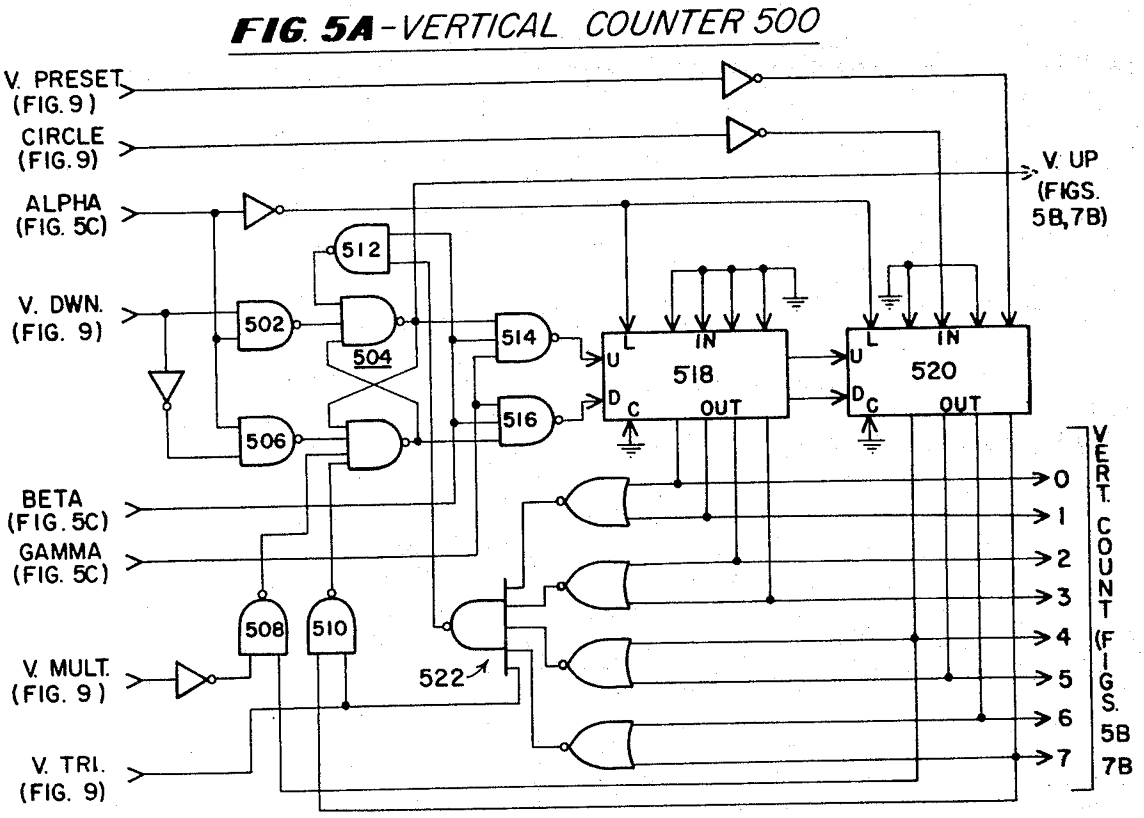
FIG. 5B - VERTICAL COMPARE 530
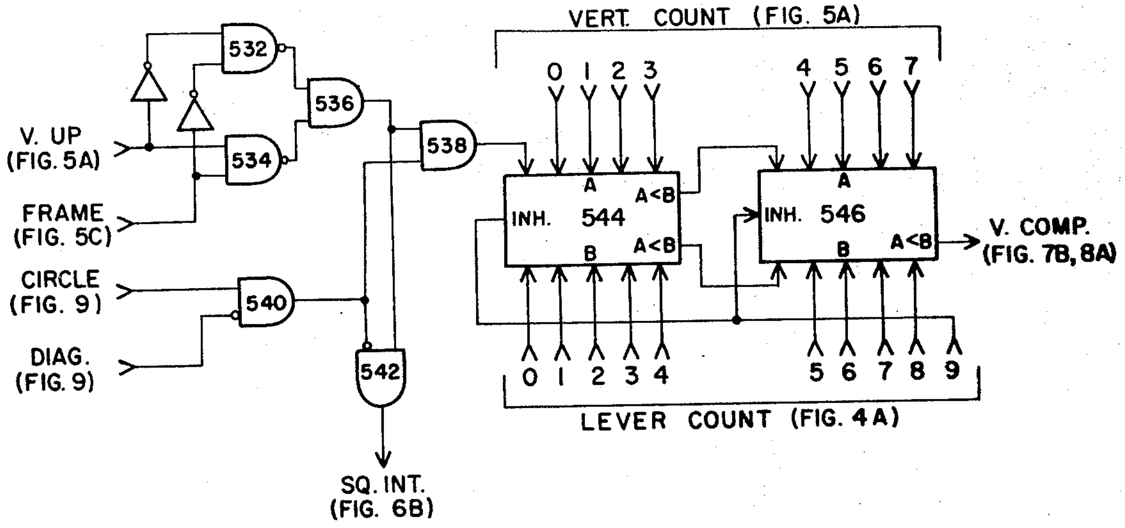

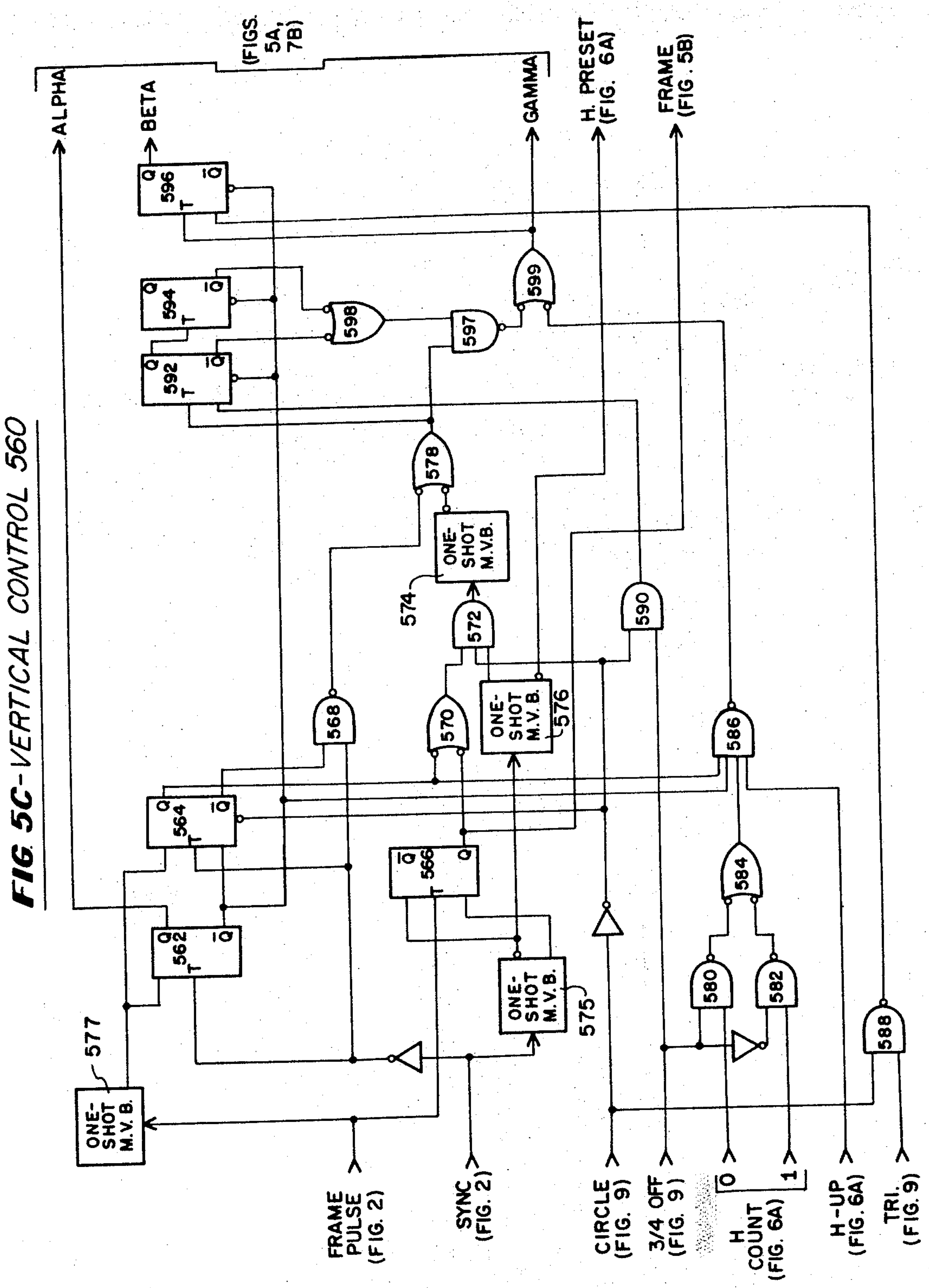
FIG. 5C - VERTICAL CONTROL 560

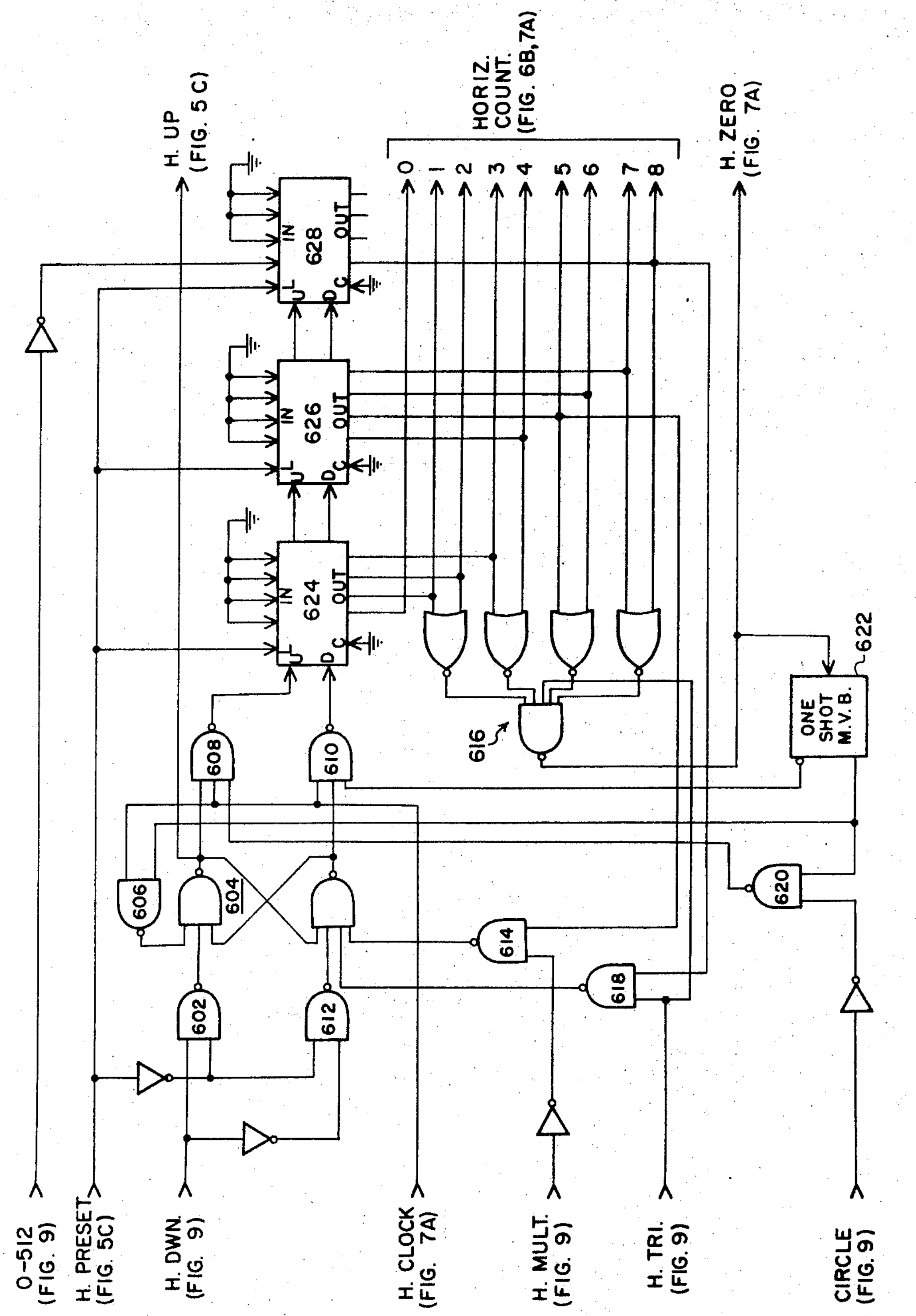
FIG. 6A - HORIZONTAL COUNTER 600

FIG. 6B HORIZONTAL AND DIAGONAL ADDER 680 AND HORIZONTAL COMPARE 650
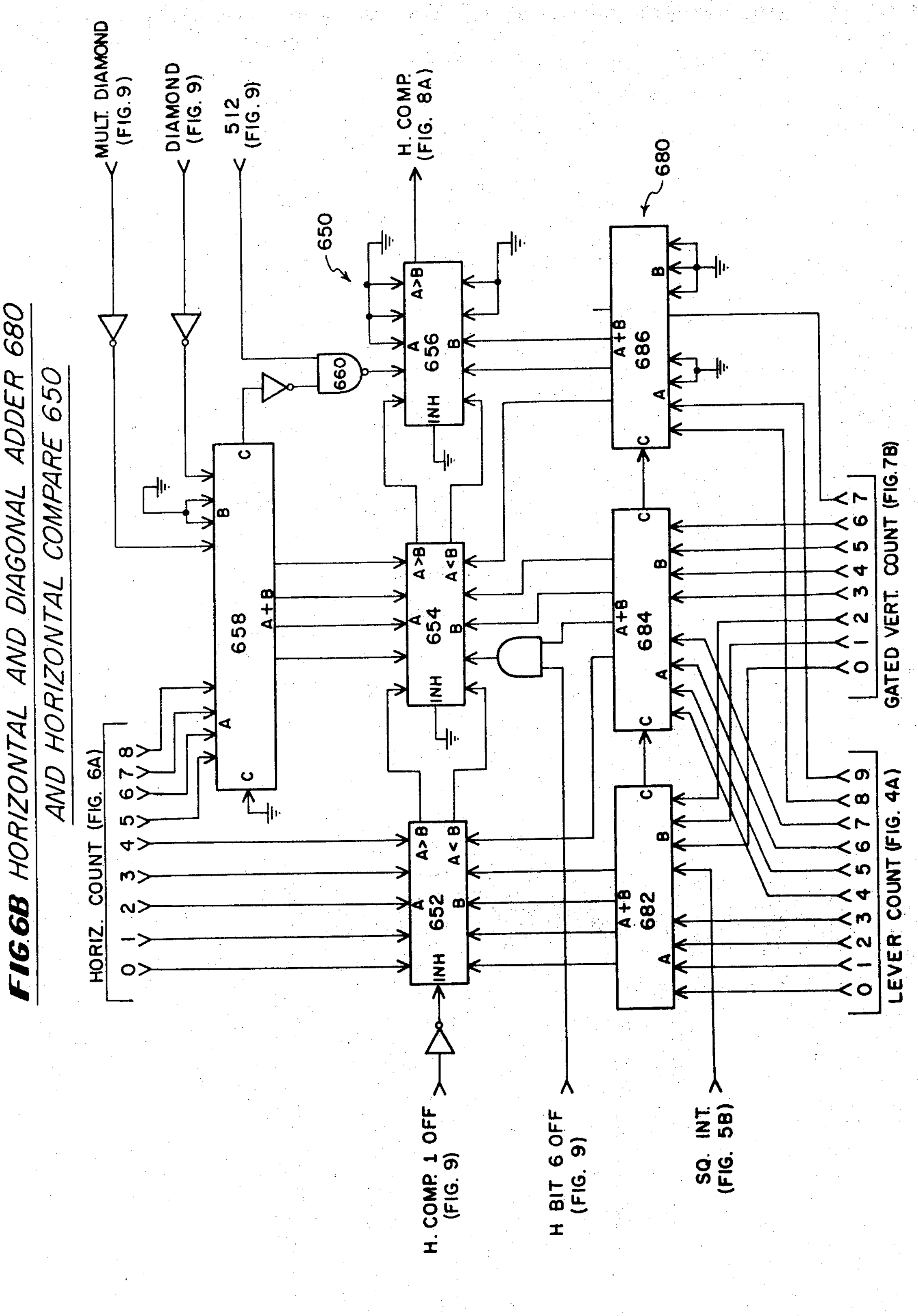

FIG. 7A - HORIZONTAL SQUARER 700
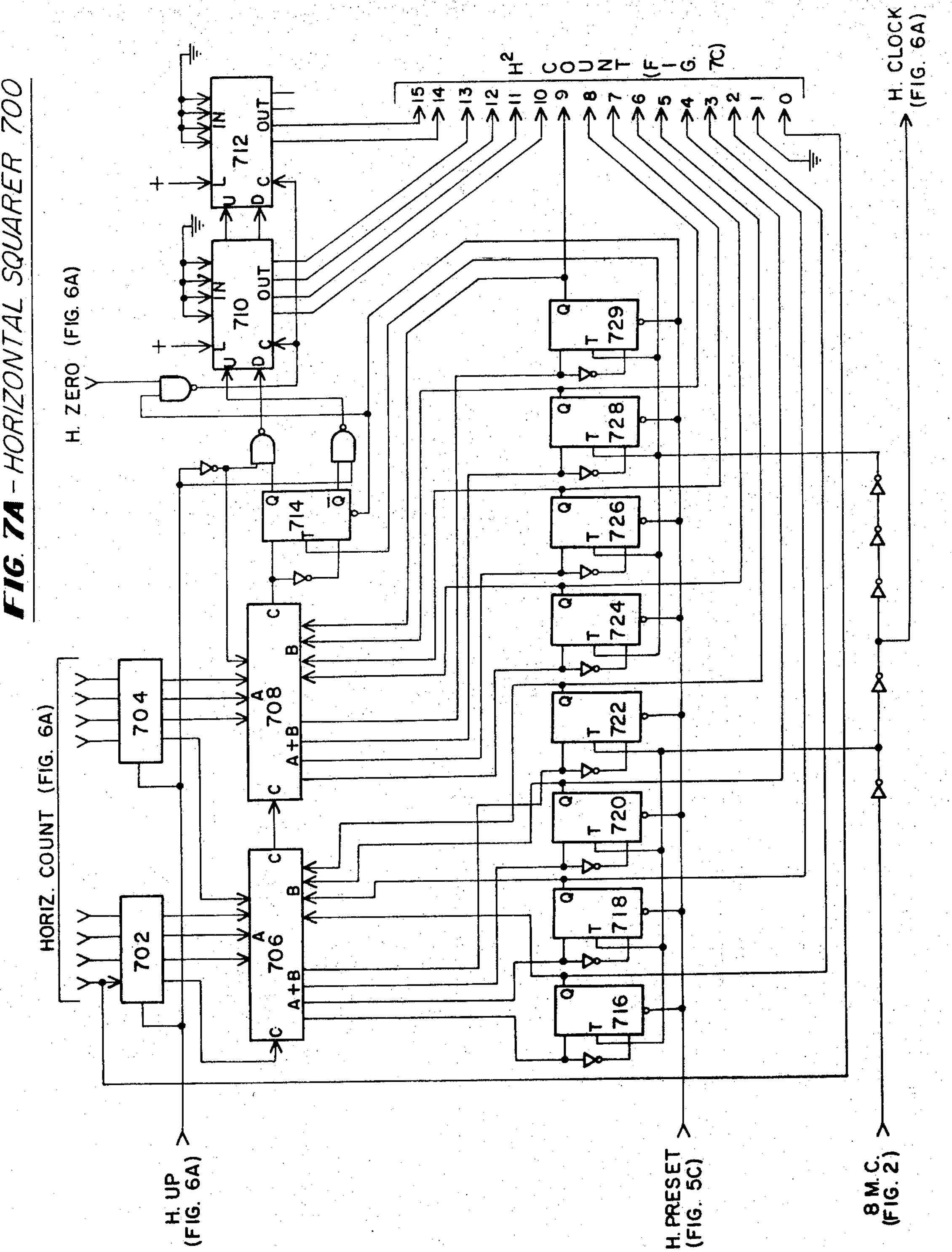

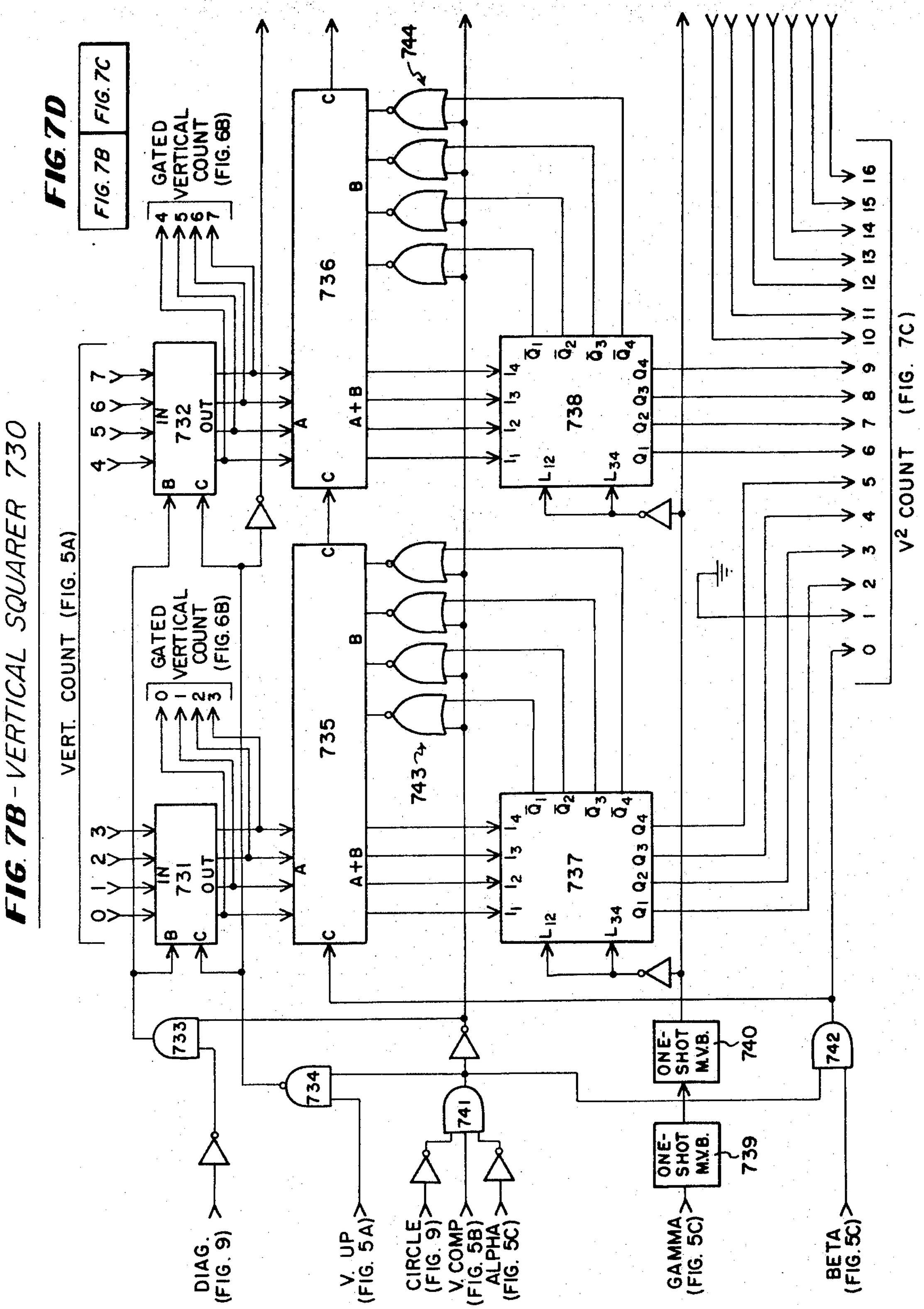
FIG. 7B - VERTICAL SQUARER 730, FIG. 7D

FIG 7E - CIRCLE COMPARE 760
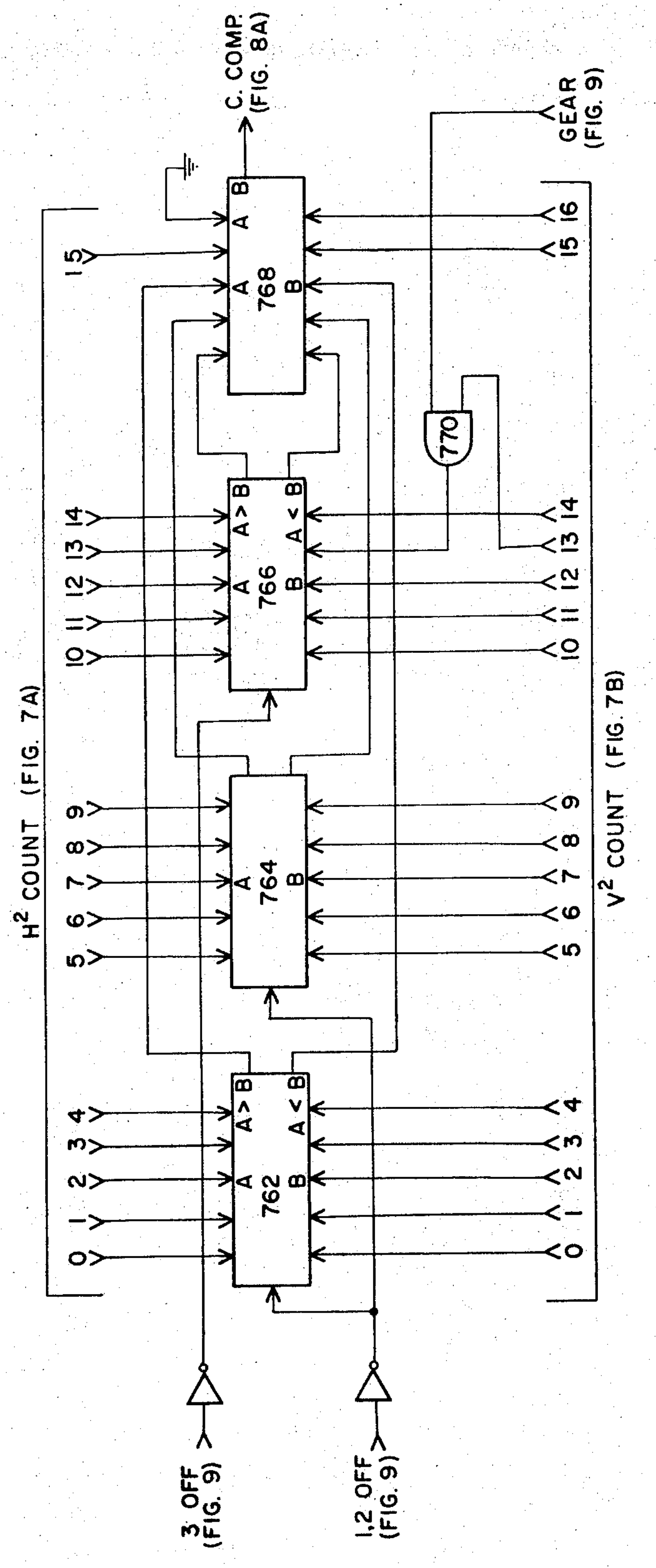

FIG. 8A - OUTPUT SWITCH 800
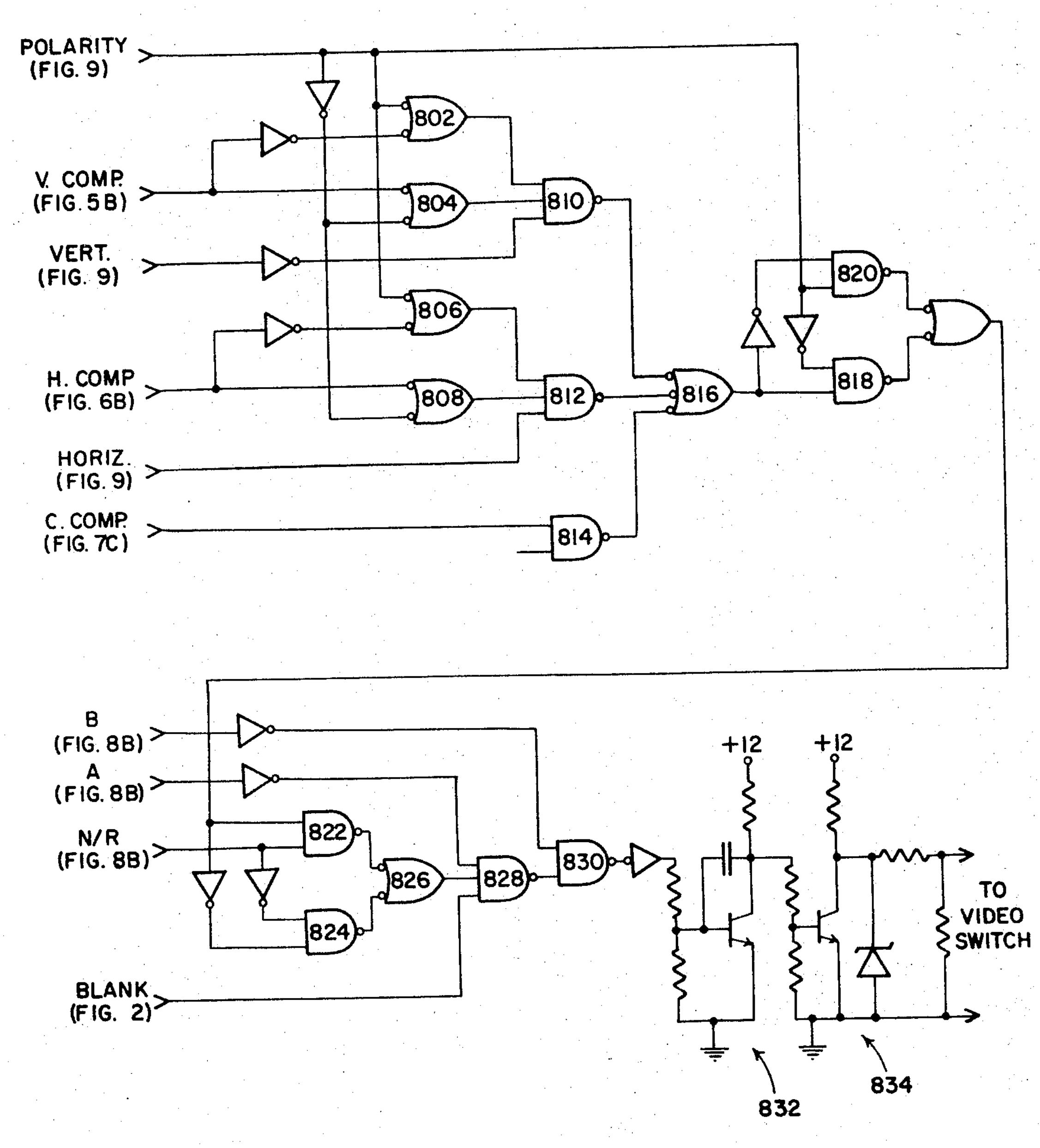

FIG. 8B - OUTPUT POLARITY CONTROL 850
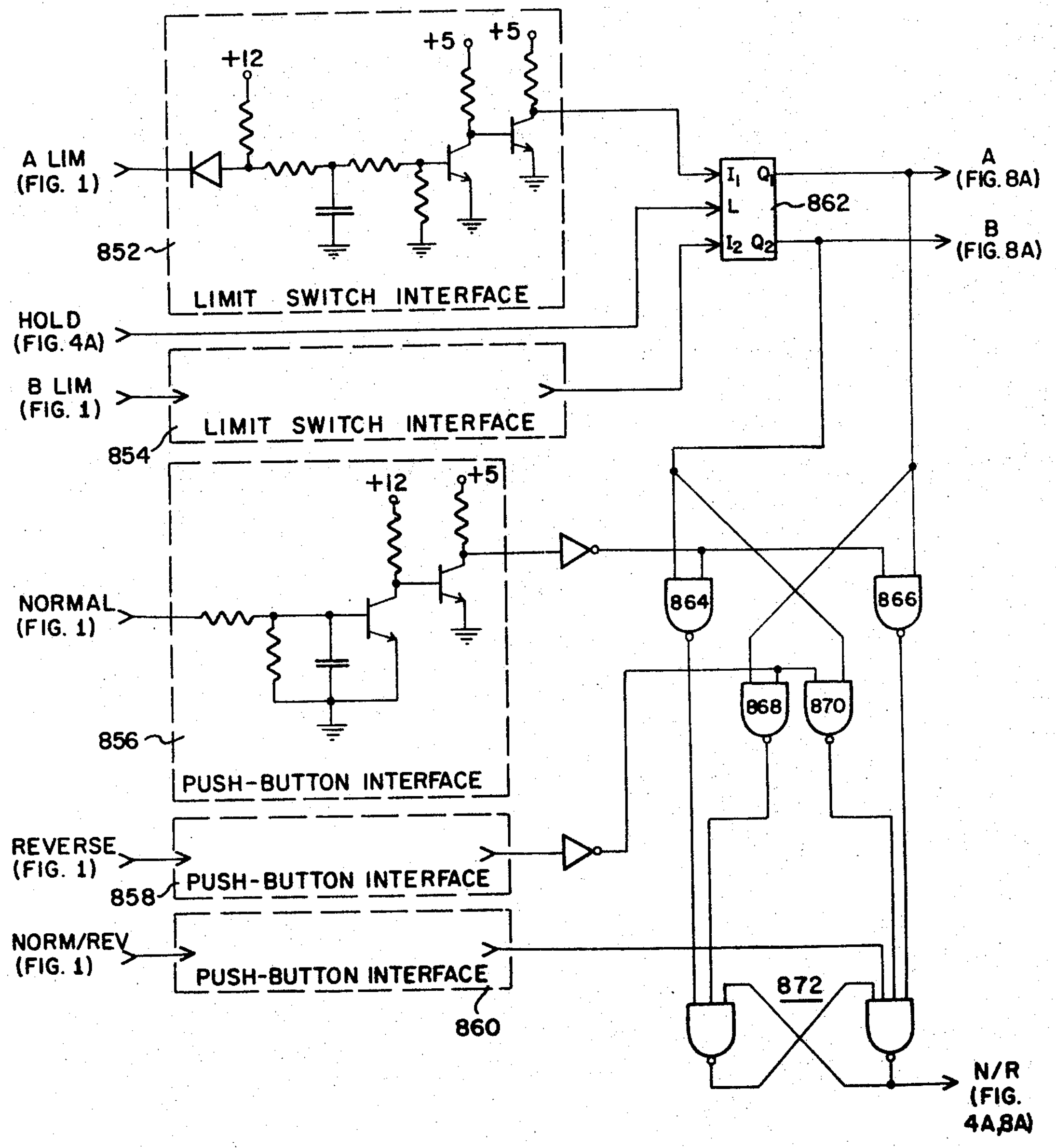

Patented Sept. 11, 1973
3,758,712
20 Sheets-Sheet 17
FIG. 9 - CONTROL SIGNALS
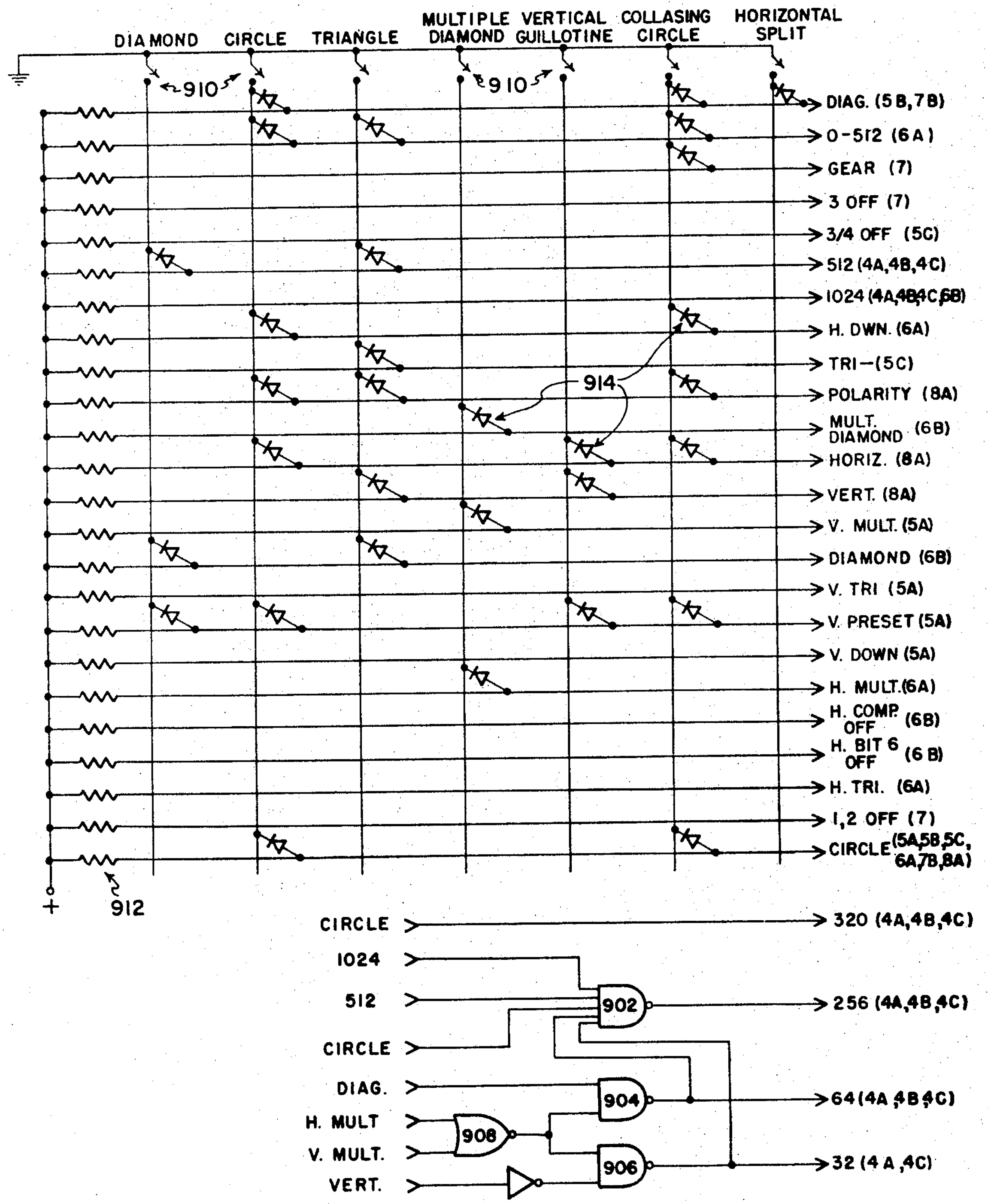

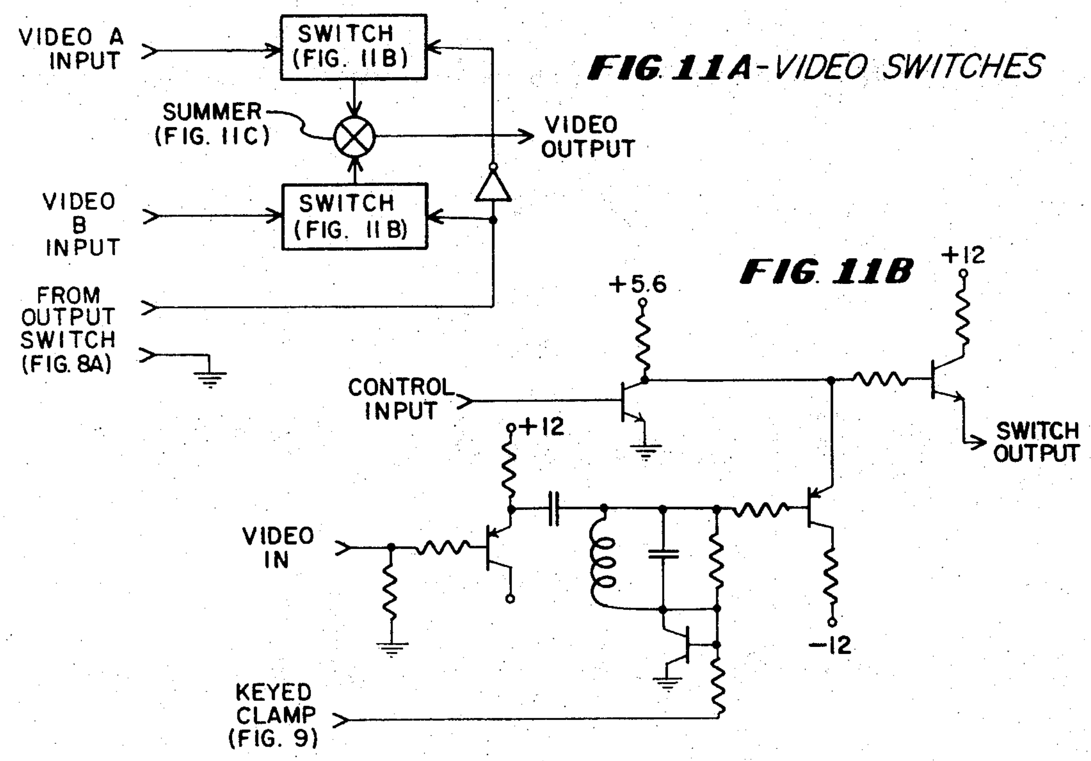
FIG. 11A - VIDEO SWITCHES, FIG. 11B
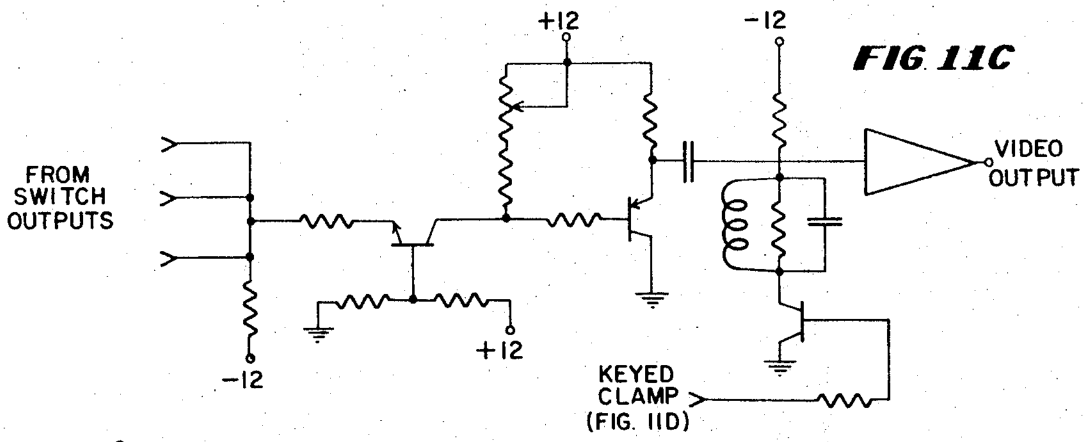
FIG. 11C
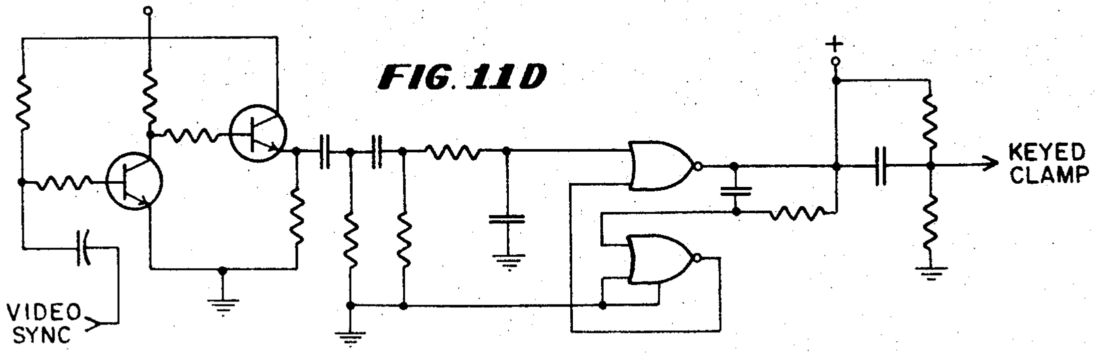
FIG. 11D

DIGITAL SPECIAL EFFECTS GENERATOR

The present invention relates generally to special effects generators for use in combining multiple input video signal into a single output video signal, and more particularly to such a generator which uses digital logic circuitry to generate intricate special effects.

Special effects generators are used in television studios to combine several video signals into a single, composite video signal. A typical special effects generator combines a portion of one signal with other portions of one or more other signals under the control of one or more levers. A typical special effect is a "horizontal wipe" in which portions of the images presented by two input signals are combined into a single output image with the line in the output image which separates the two input image portions being a vertical line and with the horizontal position of this vertical line determined by the position of a manually actuated lever. Other similar special effects are "vertical wipes" and "diagonal wipes" in which the line which separates the image portions is horizontal in the one case and sloping in the other case. Another class of special effects are those in which a square-, diamond-, triangular- or circular-shaped segment of a first input image is superimposed upon a second input image to form an output image.

The above special effects are typically generated by analog signal processing equipment including horizontal and vertical sawtooth or parabolic generators which generate analog potentials proportional to the horizontal and vertical positioning of a scanning spot or proportional to the square of the horizontal and vertical positioning of a scanning spot. Analog comparators are then arranged to compare various combinations of these analog signals, and the switching signals generated by the analog comparators operate electronic switches which switch portions of the input video signals into a single output video signal under control of the relative magnitudes of the combination signals which are being compared. The effects which may be achieved in this manner are limited generally to linear and circular special effects in which horizontal, vertical, diagonal, and circular lines are used to separate one image from another. The limitation to such linear and circular special effects rises primarily because the generation of nonlinear and animated special effects requires the carrying out of complex nonlinear computations upon the analog signals which, in practice, cannot be implemented with analog circuitry.

Analog special effects generators are difficult to align and to prepare for service. Each analog sawtooth generator must be carefully adjusted for amplitude, linearity, D.C. balance, and slope. Each triangular generator must be similarly adjusted. If circular effects are to be generated, parabolic waveform generators have to be carefully adjusted for D.C. balance, linearity, and timing. Alignment can easily occupy one or two days. All of these analog adjustments are prone to drift with temperature changes and with the aging of components, and field alignments are sometimes required.

Because analog special effect generators have to use high-speed analog comparators to compare the amplitudes of analog signals, they are subject to the problems which plague any equipment using such comparators. When the imcoming signal levels are low, high-gain comparators tend to pick up noise and interference which add jitter to the comparator output signals. The problem of noise and jitter is especially serious in the case of a generator of circular special effects, since the amplitudes of the apexes of the parabolic waveforms used to produce such effects must sometimes be compared with great precision. Analog special effect generators are unable to generate jitter-free, stable, small-diameter circular special effects.

Another related difficulty with analog special effects generators is the inability of an analog comparator to give a definite yes or no answer as to the relative magnitude of two signals which are of almost the same amplitude. If the two signals are fluctuating slowly, and analog comparator may generate an output that is neither high nor low but somewhere in between. Such an output can cause a blurring of one video signal into another. If a Schmitt trigger or a high gain amplifier is used to sharpen the comparator output, jitter can result.

Accordingly, a primary object of the present invention is to achieve a digital special effects generator which may generate a wide variety of jitter-free, well-defined special effects.

Another object of the present invention is to provide a digital special effects generator which may produce circular and elliptical special effects which are jitter-free and highly stable.

A further object is the construction of a special effects generator which requires a minimal amount of alignment and which is not prone to drift.

A more specific object of the invention is to obtain circuitry which may generate the square of successive input values at a rate of speed which compares favorably with the horizontal scanning speed of a television system.

Yet another object of the present invention is to provide a special effects generator which may generate intricate nonlinear and animated special effects of a type which cannot be achieved by conventional analog circuitry.

In accordance with these and many other objects, an embodiment of the present invention comprises, in brief, a special effects generator which is implemented using digital logic circuitry. The circuitry accepts as an input an analog signal from some form of lever control which is used to control the execution of wipes and other special effects. The circuitry generates as an output a signal which is either high or low and which determines which of two incoming video signals passes through a video switching circuit.

The lever control input signal is converted into a proportional lever number by an analog-to-digital converter. A horizontal counter is provided which counts during each horizontal scan and resets at the end of each horizontal scan. A vertical counter is also provided which counts during each vertical scan and resets at the end of each vertical scan. Digital comparators are arranged to compare the outputs of these counters with one another and with the lever number. A first comparator controls the generation of a horizontal wipe effect by comparing the output of the horizontal counter with the lever number and generating an output video switching signal in accordance with the outcome of the comparison. Vertical wipes are controlled by a second digital comparator which compares the vertical counter output with the lever number and generates a video switching signal in accordance with the comparison. Summation logic which allows the outputs of all three counters to be combined and fed to a single comparator allows the generation of diagonal wipes. A plurality of control signals generated in response to push button commands reprograms the counters, the comparators, and the other digital logic components to generate other intricate special effects. For example, by causing the horizontal and vertical counters to reverse their direction of count periodically, mirror image effects and venetian blind effects in both the horizontal and vertical direction may be achieved. If both the horizontal and vertical counter are programmed to reverse their direction of count periodically, mirror image mosaic effects are achieved. Other control circuits allow sections of the digital comparators and inputs to the digital comparators to be disabled, thereby producing discontinuous and jagged lines which separate one input image from another and allowing the production of animated effects in which wiggling, jagged lines separate one image from another. Wipes may be produced in which one input image appears to "eat" its way across the other input image as the lever control is actuated. These nonlinear and animated special effects have no counterpart in analog systems and represent an important advantage of the present invention.

The outputs of both the horizontal and vertical counters are fed into digital squaring circuits which generate the square of both the horizontal and the vertical count. A digital comparator compares the digital outputs of these squaring circuits and generates a video switch control signal which can produce circular and elliptical special effects which are highly stable and not prone to jitter, instability, or drift. In addition, the abovementioned techniques of reversing the direction of count periodically, disablng portions of the comparator, and disabling certain of the comparator inputs may be used to generate circular and elliptical effects having jagged, animated edges and also venetian blind and mosaic circular and elliptical effects the intricacy of which defies description with words alone.

The implementation of a circular and elliptical digital special effects is made possible by the development of novel digital hardware which can square a numerical value within a time interval of about one ten millionth of a second. This hardware has to carry out a complete squaring operation in response to a single clock pulse, since the time allowed for each square computation approaches the frequency limits of state-of-the-art digital logic. In addition to being fast, the new hardware is also far simpler than conventional multiplication hardware. Briefly described, the square-generating hardware comprises a binary full adder and some form of latch or storage register. One input to the binary full adder comprises the output of the horizontal or vertical counter with the least significant horizontal counter output bit going into the second least significant bit input of the adder so that the horizontal or vertical counter output is effectively multiplied by two. The output of the full adder is then supplied to the input of the latch or register, and the output of the latching circuit is fed back into a second input of the full adder. Pulses are then supplied alternately to the horizontal or vertical counter and to the latch or storage register—a count pulse to the counter followed by a load-data pulse to the latch or register. For reasons which are explained in detail in the specification which follows, the circuitry just described continuously generates the square of the numerical values presented at the output of the counter. In the preferred embodiment of the invention, this circuitry is simplified still further in a number of ways which are fully explained in the detailed description which follows.

In order to achieve circular wipe effects in which the circle of separation between the two input images is centered at the midpoint of the video image, the digital logic evaluates the standard equation for a circle $$X^2 = Y^2 - R^2$$

where X and Y are the outputs of the horizontal and vertical counters which are programmed to read zero count when the scanning spot is at the middle of a horizontal or vertical scan, and where R represents both the radius of the circle and the lever number the magnitude of which is proportional to the positioning of the lever control. In order to avoid the complexities of computing the sum $Y^2 - R^2$ over 500 times during each horizontal scan, the vertical squaring hardware is placed in operation with a zero value in its latch or register not at the beginning of each vertical scan but when the vertical counter output equals the lever count as determined by a comparator. Switching between the two input signals is then controlled by a comparator which simply compares the outputs of the horizontal and vertical squaring hardware, and the sum $Y^2 - R^2$ is not computed separately. A more detailed explanation of how this operation is carried out and also of how both circular and elliptical special effects may be generated with essentially the same simple digital circuitry are presented in the detailed description which follows.

An array of push buttons are provided which allow the operator of the special effects generator to determine whether a special effect proceeds in a preferred normal direction, in the reverse direction, or in a direction which is dependent upon which of two input signals currently dominates the output signal. Push buttons selection switches and limit switches on the lever control together program an output polarity control to reprogram the digital special effects generator and the output signal of the generator to give the desired wipe effects. The stability and symmetry of such normal and reverse wipes is assured by the use of digital logic.

In the preferred embodiment of the invention, 28 different control signals are used to program the digital special effects generator to produce 100 or more different forms of wipes and special effects. Any particular effect is achieved by shorting to ground a certain number of these control signals through diodes which are connected to ground by manually actuatable switches. In any given installation, push button switches connecting to ground and diode arrays are provided only for those wipes which the broadcast engineer wishes to achieve. The number of wipes and special effects which may be achieved is limited only by the number of different ways in which the 28 different signals may be connected to ground, and hence the number of wipes and special effects which may be achieved is extremely large.

Because digital comparators are used to compare digital signals, the comparator output signals are always well defined. Even a single digit difference between the numeric values which are fed into a comparator causes a definite "1" or "0" to appear at the comparator output. There is no uncertainty or instability at the comparator output, and jitter is no problem. Noise and interference also cannot cause instability or interference.

No matter how small or how close in magnitude the two numbers which are being compared may be, the digital comparator always produces a clean, well defined, and consistent output.

Alignment of the digital special effects generator typically takes about an hour, compared to a day or two for an analog generator of comparable complexity. All that needs aligning are the analog-to-digital converter for the lever control signal, a high frequency oscillator, a pair of multivibrators which determine the horizontal and vertical centering of special effects, and a few other one-shots which provide fixed pulse delays. No part of the alignment procedure is critical, and the alignments do not interact with one another. Linearity and proper horizontal-to-vertical scaling are absolutely assured by the digital logic.

Further objects and advantages of the present invention are apparent in the drawings and in the detailed description which follows. The points of novelty which characterize the invention are pointed out with particularity in the claims annexed to and forming a part of the specification.

For a better understanding of the invention, reference will be made to the drawings wherein:

FIG. 1 is an overview block diagram of a digital special effects generator designed in accordance with the present invention;

FIG. 2 is a partly schematic and partly logical diagram of a synchronous clock for use in the generator shown in FIG. 1;

FIG. 3 is a partly schematic and partly logical diagram of an analog-to-digital converter which is used to digitize the position of a manually actuatable lever;

FIG. 4A is a partly logical and partly block diagram of a counter the output of which is a digital lever number the magnitude of which is proportional to the position of the manually actuatable lever;

FIG. 4B is a logical diagram of a variable mod counter which appears in block form in FIG. 4A;

FIG. 4C is a logical diagram of a reversible counter and latch both of which appear in block form in FIG. 4A;

FIG. 5A is a logical diagram of a vertical counter the output of which represents the vertical coordinate of a point in a video image;

FIG. 5B is a logical diagram of a digital comparator which compares the output of the vertical counter shown in FIG. 5A with the output of the lever counter shown in FIG. 4A;

FIG. 5C is a logical diagram of a vertical control which controls the operation of the vertical counter shown in FIG. 5A and the computational circuit shown in FIGS. 7B and 7C;

FIG. 6A is a logical diagram of a horizontal counter the count output of which represents the horizontal coordinate of a point in a video image;

FIG. 6B is a logical diagram of a digital comparator which compares the output of the horizontal counter shown in FIG. 6A with the sum of the outputs of the lever counter and the vertical counter which are shown in FIGS. 4A and 5B;

FIG. 7A is a logical diagram of a computational circuit which computes the square of the horizontal counter output;

FIGS. 7B and 7C are logical diagrams of a computational circuit which computes the square of the vertical counter output;

FIG. 7D illustrates how FIGS. 7B and 7C are arranged to form a single diagram;

FIG. 7E is a logical diagram of a digital comparator which compares the outputs of the computational circuits shown in FIGS. 7A, 7B and 7C;

FIG. 8A is a partly logical and partly schematic diagam of an output switch for the digital special effects generator;

FIG. 8B is a partly schematic and partly logical diagram of a control circuit for the output switch shown in FIG. 7A;

FIG. 9 is a circuit diagram illustrating how control signals may be generated to program the digital special effects generator, and illustrating circuitry for generating seven out of the one-hundred or so different special effects which the generator is capable of achieving.

Figure 12:
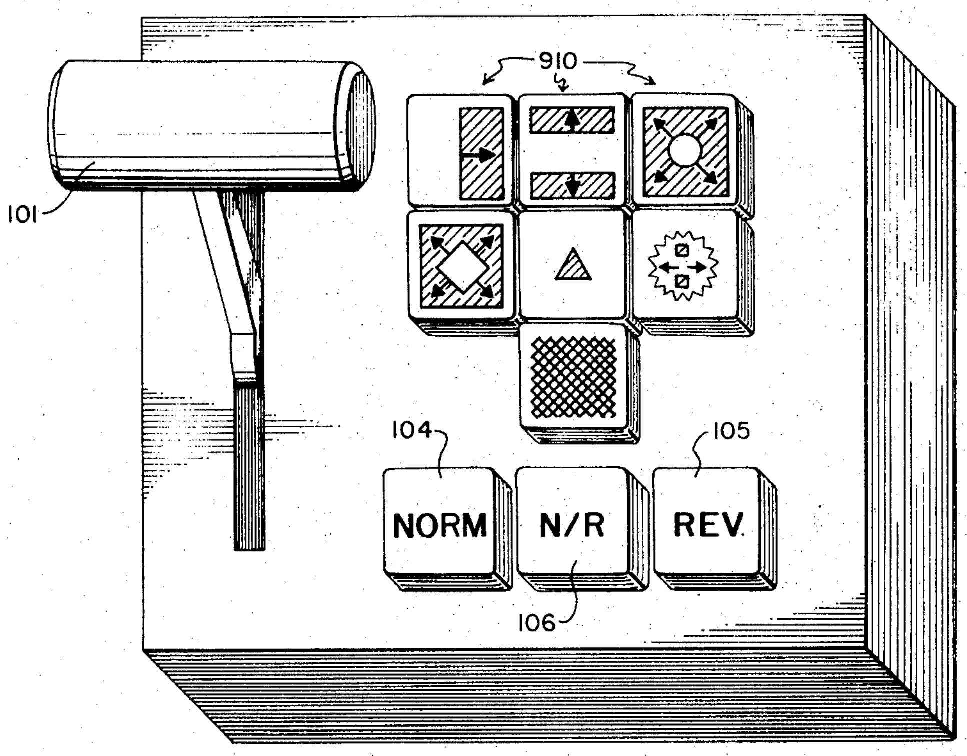

FIGS. 10A, 10B, 10C and 10D present simplified computational circuits for computing the square of a counter output;

FIG. 11A is a block diagram of a pair of video switches which may be used in conjunction with the special effects generator to switch a single output video signal between two input video signals;

FIG. 11B is a schematic diagram of the switch elements which appear as blocks in FIG. 11A;

FIG. 11C is a schematic diagram of the summer which appears as a block in FIG. 11A;

FIG. 11D is a partly schematic and partly logical diagram of a circuit which generates a keyed clamp signal that is used in FIGS. 11B and 11C; and FIG. 12 illustrates a suitable control panel for the special effects generator and also illustrates a suitable arrangement of manually actuatable controls.

TERMINOLOGY

In the detailed description which follows, the following definitions shall apply.

A "video signal" or a "composite video signal" is a signal which may be supplied to a television display device and which causes the display device to generate a visible picture. For the purpose of illustrating the present invention, a video signal is assumed to present sufficient information to cause the generation of a complete picture or "frame" containing 525 visible horizontal lines or scans every 1/30th of a second. Each such frame is assumed to include two independent "fields." Each field is assumed to include 262 ½ lines and is assumed to be generated in 1/60th of a second. Successive fields are assumed to "interlace" with one another so that the lines which comprise one field are displayed in between the lines which comprise the immediately preceding and following fields. It is to be understood that the present invention may also be used with other forms of video signal than that which is assumed for illustrative purposes.

The picture which is created by a television display device in response to the reception of a single field is called a "video image" or "image." For the purposes of the discussion which follows, and image by definition contains a single field of 262 ½ lines. The ratio of the height to the width to the diagonal of an image is assumed to be 3 to 4 to 5. The center point of an image is defined as having the X and Y coordinates (0, 0) with the X axis horizontal and the Y axis vertical. The coordinate of any point in a video image is indicated by a pair of numbers, for example (26, 50) where 26 is the X-coordinate of the point and 50 is the Y-coordinate of the point. Generally, the coordinates of a point at the center of the right-hand edge of an image is defined to be (256, 0), and an image is thus 512 units wide. Using these same units, the coordinates of a point at the center of the upper edge of an image is (192, 0), and an image is thus 384 units high. The diagonal distance from the center of an image to any corner is then 320 units of the same scale. The numbers 192, 256 and 320 and multiplies of these numbers appear repeatedly in the discussion which follows, especially in those sections dealing with the generation of circular and eliptical special effects.

A "composite video signal" by definition includes "synchronizing pulses" or "sync pulses" horizontal synchronizing pulses at the start of the signal representation for each horizontal line, and vertical synchronizing pulses at the start of the video signal representation for each field. A "video signal" may contain sync pulses, but does not have to contain such pulses. A "synchronizing signal" or a "sync signal" contains horizontal and vertical synchronizing pulses and no other video information. A "blanking signal" is a signal which is at a high level during horizontal and vertical retrace intervals when the scanning spot of a television display device "retraces" an image to position itself for the next scan. A blanking signal is usually present in a composite video signal.

The preferred embodiment of the present invention requires two video signals, a sync signal, and a blanking signal as inputs. However, if at least one of the video signals is a "composite video signal," then it is to be understood that conventional circuitry can be used to extract both a synchronizing signal and a blanking signal from the composite video signal, so that separate sources of sync and blanking signals are then not required. The use of a blanking signal in conjunction with the present invention is optional and may be dispensed with, if desired. Separate sources of video sync and blanking signals are usually available in commercial television studios, and the preferred embodiment of the invention takes advantage of these readily available signal sources.

OVERVIEW DESCRIPTION

Referring now to the drawings, FIG. 12 is an illustration of a console for a digital special effects generator having two video signal inputs and a single video signal output. This generator is capable of achieving a wide variety of interesting and diverse combinations of the two input video signals. An array of seven special effect push buttons 910 is provided to allow the broadcast engineer to select any one of seven different effects. The seven special effects which have been chosen to illustrate the present invention are: a diamond effect in which a diamond-shaped segment of a first image is superimposed upon a second image; a circular effect in which a circular segment of a first image is superimposed upon a second image; a triangular effect in which a triangular segment of a first image is superimposed upon a second image; a multiple diamond effect in which many diamond-shaped segments of a first image overlay a second image; a vertical guillotine effect in which rectangular segments of a first image appear both above and below a rectangular segment of a second image; a collapsing circle effect in which an odd-shaped circle having gear-like edges separates the images from one another; and a horizontal split effect which is a horizontal version of the vertical guillotine.

A lever control 101 is provided to control the amount of each input image which appears in the composite output image. When the lever control 101 is at one end of its range, the output video image consists entirely of only the first of the two input video images. As the lever is moved to the opposite end of its range, the first video image gives way gradually to the second video image which ultimately occupies the entire output video image. The particular pattern of intersection between the two images is determined by which of the seven special effect push buttons 910 is depressed. The lever control 101 is provided with limit switches that reprogram the special effects generator so that wipes from one video input signal to the other always proceed in the same direction, regardless of which way the lever control 101 is moved. A "normal" push button 104 programs the special effects generator to always produce wipes of one type — for example, wipes from left to right. A "reverse" push button 105 calls for the opposite wipe — for example, from right to left. A "normal/reverse" push button 106 causes wipes from a first signal to a second signal to proceed in one direction, for example, from left to right, and causes wipes from the second signal to the first signal to proceed in the opposite direction, for example, from right to left.

It is to be understood that the seven special effects which are illustratively presented below represent only a few of over 100 interesting and useful special effects which may be generated by the generator which is to be described. FIG. 9 illustrates a particular arrangement of diodes in a programming portion of the special effects generator which causes the production of the seven special effects just described. By using other combinations of diodes in this same programmer, many additional special effects may be easily achieved. Some of these are spectacular, and defy description with either words or with non-moving pictures. The present invention is capable of generating horizontal, vertical and diagonal wipes of all types; circular and eliptical wipes of all types; triangular, diamond and square wipes of all types; the above wipes with jagged, staircase or animated boundaries between images; and both horizontal and vertical venetian blind and mosaic versions of all of the above special effects. Provision is made for shifting all of the above special effects both up and down and also sideways, and for varying the position of a special effect at a high rate of speed by using an audio signal to shift the position of the special effect. However, this last mentioned feature is not disclosed in the present application.

FIG. 1 represents an overview block diagram of a digital special effects generator designed in accordance with the present invention and indicated generally by the reference numeral 100. The generator 100 is programmed to produce any desired special effect by control signals 900 which are generated under the control of the special effect push buttons 910 (see FIGS. 9 and 12). The generator 100 generates an output signal at 800 which is supplied to a pair of video switches shown in FIG. 11A to control the connection of a single video signal output to either of two video input signals. The details of the video switches are illustrated in FIGS. 11B, 11C, and 11D. A detailed description of this video switching circuitry may be found in application serial number 131,300 filed by Nikola S. Tkacenko on Apr. 5, 1971 and assigned to the same assignee as the present application. The video output signal developed in FIG. 11A is a time-multiplexed combination of portions of the two video input signals, and the particular portions of the input signals which are multiplexed together is determined by the digital special effects generator 100 shown in FIG. 1.

The manual lever control 101 (FIGS. 1 and 12), which controls the combining of two signals into a single output signal, generates an analog signal proportional to its position. This analog signal is fed into an analog-to-digital converter 300. The converter 300 is a voltage-to-frequency converter that generates a divide by N pulse signal containing a number of pulses that is proportional to the magnitude of the analog signal generated by the lever control. This signal is fed into a lever counter 600. A lever gate signal is also fed into the lever counter 600 and causes the count within the counter 600 to be displayed as an L COUNT (lever count) signal once during the production of each video image.

A horizontal counter 600 counts as each horizontal line of an image is generated, and a vertical counter 500 counts as each field of an image is generated. At any given moment, the horizontal count couput H. COUNT of the counter 600 represents the horizontal coordinate of a point of an image, and the vertical count output V. COUNT of the vertical counter 500 represents the vertical coordinate of a point of an image. These two counters present the X and Y coordinates of the image point that is being defined by the video output signal at any given moment. The horizontal counter is reset to zero during each horizontal retrace interval and the vertical counter is reset to zero during each vertical retrace interval, both under the control of a synchronous clock 200 the operation of which is controlled by synchronizing signals and blanking signals.

In general, special effects are produced by performing computations upon the values presented by the three counters 400, 500 and 600 and by then comparing the results of these computations with three digital comparators 530, 650 and 760. The three comparison signals, H. COMP., V. COMP. and C. COMP. generated by the comparators are fed to an output switch 800, and one or more of the three comparison signals is fed into a logic network the output of which controls the video switches shown in FIG. 11A. The particular comparison signals selected and the particular computations which result in the signals which are to be compared is determined by which of the special effect push buttons 910 (FIGS. 9 and 12) is depressed. With reference to FIG. 9, the actuation of any one of these push buttons causes current to flow through a number of programming diodes and causes the generation of a certain set of control signals which are listed at the righthand edge of FIG. 9. These control signals program the digital special effects generator to produce a particular computation and to select a particular set of comparator outputs for use as a video switching signal.

The simplest special effect which may be generated is a vertical wipe. This effect is achieved by simply feeding the lever counter 600 and the vertical counter 500 outputs into a vertical comparator 530. The V. COMP. signal generated by the comparator 530 is then fed to the output switch 800 and is used to control the video switches shown in FIG. 11A. For any given setting of the lever control 101, the output video signal is then coupled to a first input video signal during the generation of the upper portion of an image. When the vertical counter 500 advances past the count which is displayed by the lever counter 600, the V. COMP. signal generated by the comparator 530 changes its state and causes the output video signal to be coupled to a second input video signal during the generation of the remaining lower portion of an image. As the lever control 101 is actuated from one end of its range to the other, the line of separation between the two image segments which comprise the output video signal moves from the top to the bottom of the image, and hence a simple vertical wipe effect is achieved.

A simple horizontal wipe is achieved in essentially the same way. The output of the lever counter 600 is fed through a diagonal adder 680 to a horizontal comparator 650 where it is compared to the output of the horizontal counter 600. An H. COMP. signal is generated which starts out in one state at the beginning of each horizontal scanning line and which shifts to the opposite state somewhere in the middle of the scanning line when the count presented by the horizontal counter 600 exceeds that presented by the lever counter 400. The H. COMP. signal passes through the output switch 800 and causes the switching circuit shown in FIG. 11A to switch from the video A input to the video B input in the middle of each horizontal scanning line. The net effect is that the left-hand portion of the output video image is a segment of a first input video image, and the right-hand portion of the output video image is a segment of a second input video image. As the lever control 101 is actuated from one end of its range to the other, the line of separation between the two image segments moves from left to right or from right to left.

A diagonal wipe effect is achieved in the same basic way as a horizontal wipe effect is achieved, but in addition the vertical counter 500 is actuated so that the V. COUNT signal is added to the L. COUNT signal by the diagonal adder 680. The output signal then switches from one input signal to the other at some point during the generation of horizontal scanning line, but the point at which the switching occurs varies smoothly from the top to the bottom of an image under the control of the count presented by the vertical counter 500. Depending upon the relative rates of counting of the horizontal counter 600, the vertical counter 500, and the lever counter 400, any desired slope of the line of separation between the two image segments may be achieved, and thus any desired diagonal wipe effect may be achieved.

An important aspect of the present invention is its ability to generate circular wipe effects using digital techniques. The output of the horizontal counter 600 is fed continuously into a horizontal squarer 700 which generates the square of the horizontal counter output. In a similar manner, the output of the vertical counter 560 is fed into a vertical squarer 730, and the square of the vertical count is also generated. A circle comparator 760 is then provided to compare the outputs of the squarer 700 with the output of the squarer 730. By programming the horizontal and vertical counters to count down to zero at the center of each field and back up to full count at the end of the field, and by properly controlling the vertical squarer 730 with the number contained within the lever counter 400, it is possible to cause the circular comparator 760 to control the video switches (see FIG. 11) in such a manner that the resultant video output image contains a circular line of separation between one video input image segment and the other. Typically, one of the video input image segments appears within a circular area at the center of the output image, and the other input image segment fills the remaining portion of the output image. Eliptical wipes may also be achieved by changing the relative rate of advance of the horizontal and vertical counters 600 and 500.

The above-described horizontal, vertical, diagonal and circular wipes represent the basic special effects which may be generated by the present invention. Many additional special effects are also obtainable by varying the precise way in which the signals are compared and processed. In the preferred embodiment of the invention, 26 different individual control signals are used to control the special effects generator. Any combination of these 26 control signals may be grounded to produce a unique special effect, and hence the number of possible special effects which may be achieved is very large. At least 100 different special effects having desirable characteristics may be achieved.

It is desirable to design a special effects generator so that a wipe from an input signal A to an input signal B proceeds in the same direction as a wipe from the input signal B to the input signal A. For example, if a horizontal wipe from signal A to a signal B proceeds from left to right, it is desirable that a horizontal wipe from signal B to signal A should also proceed from right to left so that the broadcast engineer knows, in advance, in which direction the wipe will progress. To achieve this end, limit switches 102 and 103 are mechanically connected to the lever control 101 so as to be actuated when the lever control 101 is in one or the other of its extreme positions. The limit switches 102 and 103 program an output polarity control 850 to generate an N/R (normal or reverse) signal. The N/R signal programs the special effects generator in accordance with whether a wipe in a first, or normal direction or a wipe in a second, or reverse direction is desired. Assuming that a NORMAL push button switch 104 is actuated, as would normally be the case, the state of the N/R signal is determined entirely by which of the two limit switches 102 and 103 was the last to be actuated. As an example, assume that the output video signal consists entirely of an input signal A within the recent past. At that time, the lever control 101 actuated the A limit switch 103. A bistable or memory device within the output polarity control 850 recorded the fact that the limit switch A was the last limit switch to be actuated and causes the generation of a high level N/R signal. This high level signal programs the special effects generator to produce wipes from signal A to signal B which proceed in the normal direction, for example, from left to right in the case of a horizontal wipe. When the control lever 101 is moved to the opposite extreme position, then the output signal consists entirely of signal B and the B limit switch 102 is actuated. The output polarity control 850 records this fact and generates a low level N/R signal to reprogram the special effects generator so that wipes proceed in a normal direction for the signal B to the signal A, for example, from left to right in the case of the horizontal wipe.

If reverse wipes are desired, a REVERSE push button switch 105 is actuated. The output polarity control 850 is then reprogrammed to generate a low level N/R signal in response to actuation of the A limit switch 103 and a high level N/R signal response to actuation of the B limit switch 102. Wipes then proceed in a reverse direction, for example, from right to left in the case of a horizontal wipe. If a NORMAL/REVERSE switch 106 is actuated, then the limit switches 102 and 103 have no effect upon the N/R signal, and the N/R signal remains continuously at a high level. Wipes from signal A to signal B then proceed in the normal direction, for example from left to right in the case of a horizontal wipe, and wipes from the signal B to the signal A proceed in the reverse direction, for example from right to left in the case of a horizontal wipe.

The output polarity control 850 generates control signals A and B whenever the A limit switch 103 or the B limit switch 102 is actuated by the lever control 101. The purpose of the signals A and B is to determine the polarity of the video switching signal generated by the output switch 800 when the lever control 101 is in one or its extreme positions. By way of further explanation, when the lever control 101 is in an extreme position, the image portion of the video output signal generated in FIG. 11A is entirely composed of one input signal. It is therefore desirable that the synchronizing pulses in this output signal also correspond to the same input signal. During the generation of special effects, the video output signal generated in FIG. 11A includes portions of two input signals, and the synchronizing portion of the output signal is arbitrarily extracted from one or the other of the two input signals but not from both. As the lever control 101 is moved to an extreme position, the signals A and B reprogram the output switch 800 so that regardless of what synchronizing pulses were supplied to the video output signal previously, the synchronizing pulses from the input signal which now dominates the output signal are now selected. When the lever control 101 is at either end of its range, the broadcast engineer is assured that the video output signal consists entirely of only one of the two input video signals and does not include the synchronizing portion of one input signal and the image portion of the other.

Wherever possible, computations carried out by the digital special effects generator 100 and counter advances are carried out during the horizontal or vertical retrace or blanking intervals. A number of the control signals shown in FIG. 1 are to enable various components of the generator 100 to determine at what times special computations may be carried out. A detailed explanation of each of the signals is to be found in later portions of this description.

THE GENERATION OF CIRCULAR WIPES AND SPECIAL EFFECTS

A significant feature of the present invention is its ability to generate circular and elliptical wipes and special effects. The digital generation of circular and elliptical special effects involves carrying out complex mathematical computations and comparisons at extremely high rates of speed. A significant feature of the present invention is its ability to carry out the necessary complex computations at an extremely high rate of speed using relatively simple circuitry.

Stated most simply, the basic problem underlying the generation of a circular special effect is that of determining at what moement in time one is to switch from a first video input signal to a second video input signal. Consider the problem of achieving a circular wipe effect in which a section of a first input image is to be entirely enclosed within a circular area towards the center of an output image and in which a section of a second input image is to fill the remainder of the output image. The coordinates of the point in an output image which is presented by the output signal at any moment in time are available. The horizontal counter counts during each horizontal scan and at any moment presents the X-coordinate of an image point, and the vertical counter counts during each vertical scan and at any moment presents the Y-coordinate of an image point. The two counters are both programmed to count from a fixed value down to zero and then back up to the same fixed value during each horizontal and vertical scan. In the preferred embodiment of the invention, the horizontal counter counts from 256 down to zero as a scan proceeds from the left edge to the center of an image and then counts back up to 256 as the scan proceeds to the right edge of the image. The vertical counter similarly counts from 192 when a vertical scan begins down to zero when the vertical scan reaches the center of an image and then back up to 192 when the scan reaches the opposite edge of the image. The count output of the horizontal counter is thus the X-coordinate of a point in an image, and the count output of the vertical counter is the Y-coordinate of the same point. The coordinate X- and Y-axis are assumed to intersect at the center of the image, as has already been explained.

The equation for a circle centered about the origin of an X-Y coordinate system is:

$$X^2 + Y^2 = R^2 \qquad (i)$$

Where X and Y respectively are the horizontal and vertical coordinates of image points on the circle and where R is the circle radius whose value is preferably equal or proportional to the signal output of the lever control 101 (FIG. 1). Thus, adjustment of the lever control 101 changes the radius of the circle. Assuming that an image segment from an input signal A is to fill this circle and that an image segment from an input signal B is to fill the area outside of the circle, the criterion controlling the generation of a switching signal for application to the switches shown in FIG. 11A is as follows: If $X^2 + Y^2$ is greater than $R^2$, then the switching signal is to cause the input video signal B to be supplied as the video output signal; and if $X^2 + Y^2$ is less than $R^2$, then the switching signal is to cause the video signal A to be supplied as the video output signal. The value of the circle radius R is then varied as the lever control 101 is shifted so as to cause a circular wipe between the signals A and B. Preferably, the radius R should vary linearly as the lever control 101 is shifted so as to produce a smooth wipe.

Direct implementation of the above equation is difficult using available, state-of-the-art digital logic circuitry. Full evaluation of the above equation calls for three multiplications, one addition, and a comparison. The computation of $Y^2$ and of $R^2$ may be carried out during the horizontal retrace interval; but the computation of $X^2$ and the comparison have to be carried out over 500 times during each horizontal scan. One multiplication and comparison thus must be performed approximately every 100 nanoseconds, and 10 million multiplications and comparisons have to be carried out each second. While it is possible to carry out a simple arithmetic operation within a 10 millionth of a second, the evaluation of a complex equation involving both multiplication and addition goes beyond the normal capabilities of conventional logic circuitry.

Because of this hardware limitation, new techniques for computing the multiplications involved in the above computation have been discovered and utilized. In the case of both the horizontal and vertical counters, the square of a number which is presented at the output of an advancing counter is to be computed. Since the counters are advanced between each successive computation of a square, and since the same squaring operation is carried out on each number generated by the counters, the square of a number previously squared is always available for use when the square of the number one greater or one less than that number is to be computed. It is therefore possible to use one of the following equations for computing the square of a number:

$$(X + 1)^2 = X^2 + 2X + 1 \qquad (ii)$$

$$(X - 1)^2 = X^2 - 2X + 1 \qquad (iii)$$

The above equations utilize the fact that when the square of "X + 1" or "X − 1" is computed, the square of X is available to aid in the computation. It is thus only necessary to add or to subtract two times the value of the number previously squared plus 1 to the previous square result in order to obtain the new square result.

Figure 10B:
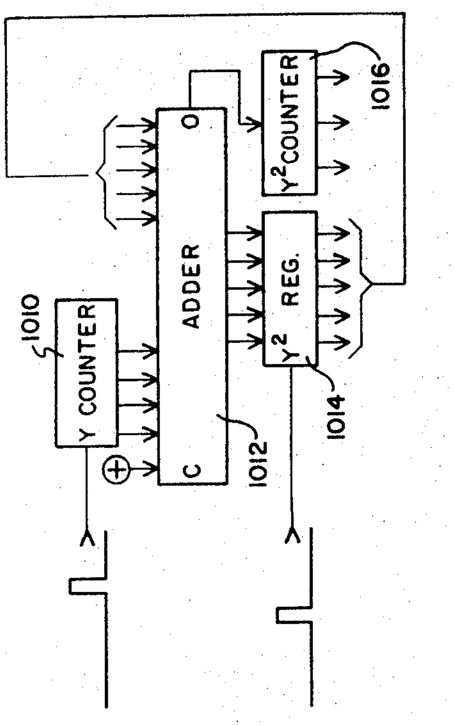
Figure 10D:
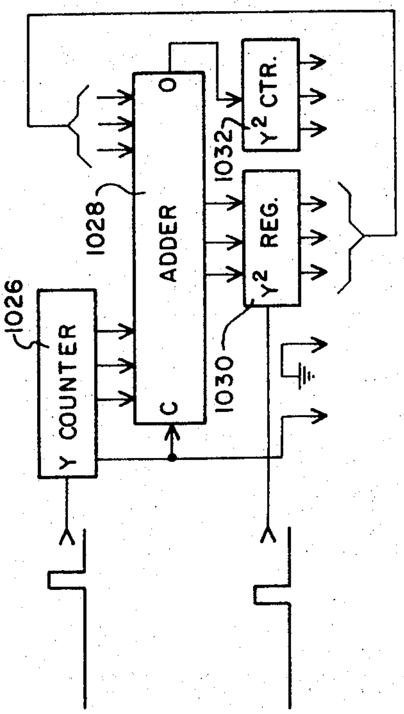
Figure 10A:
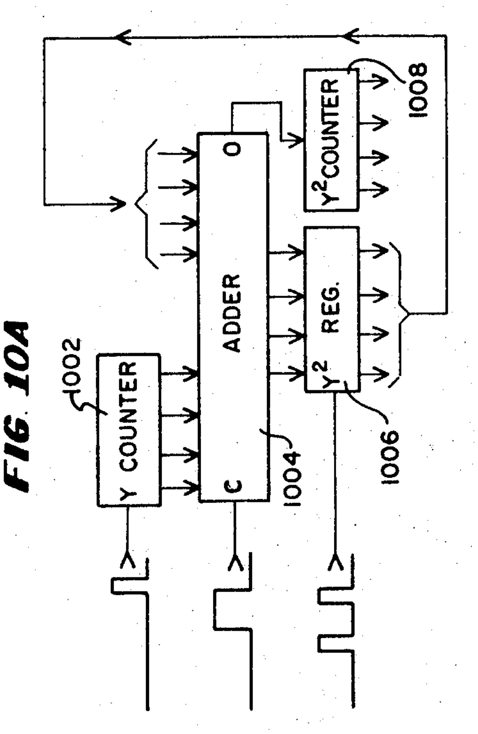

FIG. 10A illustrates in block diagram form a simple computational circuit for carrying out the computation illustrated in equation *ii*. A Y counter 1002 presents a vertical scan count value and is incremented periodically by pulses. A latch or register 1006 contains the value of $Y^2$. Equation ii is evaluated by supplying two successive load pulses to the $Y^2$ register 1006. The carry input to the adder 1004 is held high during the generation of one of these pulses. During the first pulse, the value presented by the Y counter 1002 is added into the value currently residing within the $Y^2$ register which value is fed into the alternate input to the adder 1004. During the second pulse, the value presented by the Y counter 1002 is again added to the value already stored within the register 1006, and in addition 1 is added to the sum because the carry signal is high. The Y counter 1002 is then incremented by an additional separate pulse. By repeatedly pulsing the Y counter 1002 and the register 1006 in the manner just described, it is possible to continuously generate the square of the value stored within the Y counter. Overflows generated by the adder 1004 are counted and stored within a $Y^2$ counter 1008. This $Y^2$ counter is equivalent to extending the adder 1004 and the $Y^2$ register 1006 to include additional digit positions, but requires less hardware for its implementation.

The circuitry described in FIG. 10A satisfactorily carries out the computation shown in equation ii but requires 3 timing pulses. A simplification of this circuitry is shown in FIG. 10B. In FIG. 10B, the Y counter 1010 is connected to the adder 1012 in such a manner that the least significant digit generated by the Y counter is supplied to the second least significant digit input of the adder 1012, the second least significant counter digit is supplied to the third least significant input, and so on. This shifting of the Y counter output by one bit position at the adder input is equivalent to multiplying the Y counter value by 2. The equivalence of shifting and multiplication may best be understood by reference to the decimal number system (base 10) in which the shifting of a number by the addition of a zero at the end of the number multiplies the number by 10, the base of the decimal number system. By direct analogy, in the binary number system (base 2) which is used here, shifting of a number multiplies the number by 2, the base of the number system. The least significant digit input to the adder 1012 is clamped to a high level potential so as to add 1 to any sum generated. Assuming that a value Y is stored within the Y counter 1010 and that a value $Y^2$ is stored within the register 1014, when a pulse is applied to the register 1014, the $Y^2$ valve at the output of the register 1014 is added to two times the Y value presented by the counter 1010 plus a one supplied to the least significant digit input of the adder 1012. Hence, the circuitry shown in FIG. 10B carries out the computation illustrated in equation ii in response to a single clock pulse. A second clock pulse is then applied to the Y counter 1010 to advance the counter 1010 so that the Y value stored within the counter 1010 corresponds to the $Y^2$ value presented by the register 1014. As in the case of FIG. 10A, a $Y^2$ counter 1016 is provided to store overflow counts from the adder 1012 and to thereby allow the value of $Y^2$ to have more digits than the value of Y presented by the counter 1010.

Figure 10C:
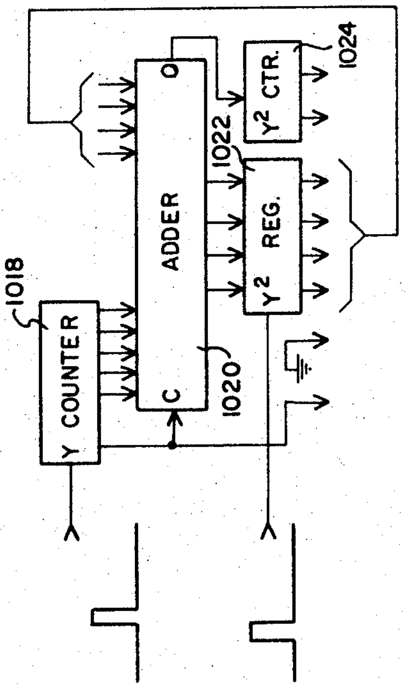

A study of the binary number representations for numbers and their squares reveals three facts which allow the circuit shown in FIG. 10B to be further simplified to that shown in FIG. 10C. First of all, the least significant digit in the square of a binary number is always identical to the least significant digit of the number which is squared. Hence, the least significant digit generated by the Y counter 1018 may be brought directly out as the $Y^2$ value least significant digit, as is shown in FIG. 10C. Secondly, whenever a binary number is squared, the second least significant digit of the square is always zero. Hence, the second least significant digit of the $Y^2$ value may be permanently grounded and need not be generated by computation. This is also illustrated in FIG. 10C. Finally, when equation ii above is evaluated for the third least significant digit of the $Y^2$ value and for the other more significant digits, it is found that the third least significant digit and all the more significant digits are the Y counter digits beginning with the second least significant digits added to the $Y^2$ digits beginning with the third least significant digit and including a carry input which corresponds to the least significant Y counter digit. Hence, it is possible to interconnect the outputs of the Y counter 1018 in FIG. 10C to the adder 1020 in the manner shown, with the least significant digit serving as a carry input to the adder 1020 and with the remaining counter digits serving as other inputs to the adder 1020. In operation, a first timing pulse is applied to the $Y^2$ register 1022. This timing pulse causes the output of the Y counter 1018 to be added to the present contents of the $Y^2$ register 1022 in such a manner as to generate the more significant digits of the new square value. A pulse is then applied to the Y counter 1018 so as to generate the least significant digit of the $Y^2$ value. Overflow pulses are again stored within a $Y^2$ counter 1024. The embodiment shown in FIG. 10D is similar to that shown in FIG. 10C but includes one less stage in the adder and one more stage in the $Y^2$ counter. A comparison to FIGS. 10B and 10D thus reveals that the preferred embodiment of the squarer as implemented to FIG. 10D requires fewer stages in the adder 1028 and in the register 1030 than does the squarer shown in FIG. 10B. Since the added stages of the counter 1032 are less expensive than the eliminated stages of the adder of 1028 and of the register 1030, a cost savings is achieved. Computational time is also reduced slightly, since one less stage of the adder is used.

With reference to FIG. 1, the horizontal squarer 700 and the vertical squarer 730 are designed basically in accordance with the computational scheme illustrated in FIG. 10D. These squarers are thus able to compute the values $X^2$ and $Y^2$ in response to a single timing pulse and within the scope of a single timing interval. They therefore make it possible for the present invention to perform the computation of the value $X^2$ at roughtly a 10 megacycle rate using currently available logic components. The squarers 700 and 730 are also far simpler than conventional multiplication logic.

Equation 1 requires the values $X^2$ and $Y^2$ to be summed and compared to the value of an $R^2$ value which is the square of a number proportional to the positioning of the lever control 101 in FIG. 1. In the preferred embodiment of the invention, the necessity of computing the value $R^2$ and of summing the values $X^2$ and $Y^2$ is avoided. With reference to FIG. 1, when the vertical counter 500 counts down to the same count as the lever counter 400, a vertical compare signal is generated by the vertical comparator 530 and is supplied to the vertical squarer 730. This vertical compare signal places the vertical squarer 730 into operation. With reference to FIG. 10D, when the vertical squarer is placed in operation, the $Y^2$ register 1030 and the $Y^2$ counter 1032 contain zero count, and the Y counter 1026 contains a count corresponding to the Y-coordinate of the image point which is carried by the generator video output signal. From this time onward, the horizontal squarer 700 and the vertical squarer 730 are placed in operation and perform in exactly the manner described above and illustrated in FIGS. 10C and 10D. A circle comparator 760 compares the output counts of the horizontal squarer 700 and the vertical squarer 730 and switches the output video signal between the two input video signals in accordance with which of the two signals is the greater.

The above configuration of hardware for generating a circular wipe effect is based upon a modified form of equation *i:*

$$X^2 = R^2 - Y^2 \quad (iv.)$$

In the practical application of the above equation, the video output signal is entirely composed of a first input signalB until the vertical scanning has proceeded downwards to the signal B edge of the circle defined by the above equation. When the vertical scan reaches the circle, the values $R^2$ and $Y^2$ in the above equation are equal and their difference is zero. The values R and Y are also equal. It will be remembered that R is a number proportional to the position of the lever control 101 and that Y is the output of the vertical counter 500 shown in FIG. 1. It is, therefore, possible to use the vertical comparator 530 shown in FIG. 1 to determine when the value of R as presented by the lever counter 400 equals the value Y as presented by the vertical counter 500. At this point in time, the vertical comparator 530 generates the V. COMP. signal. This signal places the vertical square 730 into operation for the first time during the scan. With reference to FIG. 10D, the $Y^2$ register 1030 and the $Y^2$ counter 1032 contains zero at this point in time. Hence, the contents of the $Y^2$ register 1030 and of the $Y^2$ counter 1032 represent the total quantity $R^2 - Y^2$ rather than just the value $Y^2$. The $Y^2$ register 1030 and the Y counter 1026 are then alternately pulsed at the end of each horizontal scanning line. The pulses applied to the $Y^2$ register 1030 cause two times the Y value presented by the Y counter 1026, minus 1, to be subtracted from the value stored in the $Y^2$ register 1030 and the $Y^2$ counter 1032 (the subtraction circuitry is omitted from FIG. 10 for clarity).

In this manner, the value of the total quantity $R^2 - Y^2$ for the next value of Y is computed and is stored in the register 1030 and in the counter 1032. Hence, during the next horizontal scanning line, the circle comparator 760 shown in FIG. 1 compares the value of $X^2$ to the computed value $R^2 - Y^2$ and switches between the two video signals in accordance with the result of this comparison. The special effects generator 100 is thus able to generate circular wipe effects. A more detailed explanation of how both circular and eliptical wipes and special effects may be achieved is presented below.

LOGIC DIAGRAMS AND SYMBOLS

In accordance with the preferred practice of electronic circuit designers, the details of the generator 100 are primarily represented by logic diagrams rather than by circuit diagrams. In physically constructing the system 100, each logic element shown is replaced by an equivalent electrical circuit that performs the logical task defined by the logic element. The use of logic elements emphasizes that any of the many differing electrical circuits capable of performing a given logical task may be used interchangeably in constructing the present invention.

Within the generator 100, a high level or more positive potential normally represents a "1," "TRUE" or "PRESENT" signal, and a low level or more negative potential or ground potential normally represents a "0," "FALSE," or "ABSENT" signal. However, signals are often encountered in an inverted form. This is generally indicated in the drawings by a circle at the input or at the output of a logical gate. In the specification, inversion is occasionally indicated by placing the word "inverted" before the name of the signal. More usually, inversions are not mentioned in the specification, since they are generally clearly indicated in the figures. In the case of an inverted signal, a low level potential represents a "1," "TRUE" or "PRESENT" signal, and a high level potential represents a "0," "FALSE" or "ABSENT" signal.

Throughout the specification, the names of signals are written entirely in capitals so they may be easily identified as such.

The preferred embodiment of the generator 100 is constructed primarily from transistor-transistor integrated circuit logic elements (series 7400) manufactured by Texas Instruments, Incorporated of Houston, Texas. A few of the generator sections are constructed from discrete components, and in such cases circuit diagrams are supplied. High gain operational amplifiers are represented by the conventional triangular symbol, and their details are not shown. The digital comparators are Model No. 9324 manufactured by Fairchild Semiconductor Division of Fairchild Camera and Instrument Corporation, Mountain View, California.

The fundamental element of the transistor-transistor logic system is the NAND gate, such as the gate 408 shown in FIG. 4A. The NAND gate 408 has two inputs into and a single output from a D-shaped figure which is used as the standard logic symbol for an AND gate in this description. The circle separating the D-shaped figure from the output lead signifies an inversion of the output signal, and thus identifies the gate as a NAND gate. The output lead from this unit is high or at a more positive potential at all times except when all of the inputs are at a high or more positive potential, at which time the output drops to a low or more negative potential.

Inverters (NOT gates) are represented by a small triangular amplifier symbol with an inversion-indicating circle separating an input or an output lead from the triangle to indicate inversion. Inverters are conveniently formed from NAND gates having their inputs wired together in parallel. Inverters are normally never mentioned in the description which follows, since they do nothing more than invert the signals which pass through them. When an inverter is connected serially to the input of another gate, sometimes the inverter is omitted and a circle is placed at that input to the gate to indicate an inversion of the signal.

A typical NOR gate is the gate 422 shown in FIG. 4B. The symbol for a NOR gate is an arrow-shaped OR gate having two inputs and having a single output separated from the point of the arrow by an inverting circle. The output of the NOR gate 402 is high or positive if and only if both of the gate inputs are at a low or more negative potential. If either of the input leads is at a high potential, the output falls to a low level potential. An alternative form of !NOR gate is illustrated by the gate 584 shown in FIG. 5C and has circles separating the inputs to the gate from the gate itself. The output of the NOR gate 584 is low or negative if and only if both of the input leads are at a high or more positive potential. If either of the input leads is at a low level, the output rises to a high level potential. Electrically and physically, the NOR gate 584 and all similar NOR gates are identical to NAND gates such as the gate 408 discussed above. Logically, NOR gates are normally used to perform an OR logic function — that is, to pass either of two signals. NAND gates are normally used to control the flow of signals — that is, to permit one or more signals to control the passage of another signal through the gates. In the discussion which follows a gate is said to be disabled when one or more of its input signals are preventing another input signal from flowing through the gate. A NAND gate is said to be partially disabled when some but not all of the signal inputs to the gate are preventing another signal from flowing through the gate. Exceptional cases occasionally occur when NOR and NAND gates are used for other reasons than to mix or to gate signals, and these cases are handled individually as they arise. Circles at gate inputs or outputs always indicate inversion.

Two types of flip-flops are used in the generator 100. The first type, called the bistable, is constructed by cross-connecting the outputs and inputs of two gates. A typical example is the bistable 504 shown in FIG. 5A.

The second type of flip-flop is the standard J-K master-slave flip-flop, such as the flip-flop 564 shown in FIG. 5C. J-K flip-flops may have up to seven input leads or terminals. Of these, only the Q, the $\overline{Q}$, and the T terminals are labeled in the figures. The J and K input leads, when present, are located respectively directly across from the Q and $\overline{Q}$ output leads. S(set) and C(clear) input leads may enter the narrow side of a J-K flip-flop, respectively adjacent to the Q and $\overline{Q}$ output leads and usually through a circle to indicate inversion. Most J-K flip-flops include only a C(clear) input lead adjacent the $\overline{Q}$ output lead and no S input lead.

When the clock or toggle input T of a J-K flip-flop is at a high level, data supplied to the J and K input terminals is recorded in the master portion of the flip-flop. When the clock or toggle input T goes negative, this data is transferred to the Q terminal of the flip-flop and becomes the flip-flop output. The $\overline{Q}$ terminal presents the same output in inverted form. If the J input is high and the K input is low, then the Q output goes high when the clock or toggle input T goes negative; and if the K input is high and the J input is low, the Q output goes low when T goes negative. If both of the input terminals J and K are either open circuited, absent, or connected to a high level signal, a J-K flip-flop toggles or reverses the state of the Q and $\overline{Q}$ terminals whenever the clock or toggle input T goes from positive to negative. If both of the enabling input terminals J and K are connected to a low level potential, a J-K flip-flop remains in its prior state when the clock or toggle input T goes negative, and the flip-flop does not toggle. When a set or clear terminal is included in a J-K flip-flop, the flip-flop may be set or cleared directly to a desired state. A flip-flop is cleared by applying a low level signal to the clear input terminal. When a flip-flop is cleared, a high level signal appears at the $\overline{Q}$ output and a low level signal appears at the Q output. A flip-flop is set or primed by applying a low level signal to the set input terminal, if one exists. When a flip-flop is set, a high level appears at the Q output and a low level signal appears at the $\overline{Q}$ output.

DETAILED DESCRIPTION OF INDIVIDUAL GENERATOR COMPONENTS—INTRODUCTION

In the discussion which follows, each of the component elements of the special effects generator 100 is discussed separately. With reference to FIG. 1, each of the blocks in FIG. 1 is assigned its own reference number and also its own figure number. The discussion which follows considers separately the figure assigned to each block. As each such figure is described, occasional references are made to other figures where necessary to show interaction between elements of the generator. With the exception of the timing signals generated by the synchronous clock 200 and the control signals generated at 900, all other signals interconnecting the various blocks are shown in FIG. 1. As an additional aid to the reader, each signal which enters or leaves a figure includes an identification of what figure or figures it comes from or goes to, and hence the interconnections between the generator elements may be traced out without reference to the overview FIG. 1.

SYNCHRONOUS CLOCK

The synchronous clock 200 is illustrated in FIG. 2. This clock generates timing signals which control the operation of the digital special effects generator and which synchronize the operation of the generator with the synchronizing signals which accompany the video signals that are being switched.

With reference to the upper third of FIG. 2, a clock circuit is shown which generates timing pulses approximately at an 8 megacycle rate. The first of these timing pulses generated during each horizontal scan interval is phase-locked with the termination of the horizontal blanking signal. The timing pulses are generated basically by an oscillator 204 and are amplified by an amplifier circuit 206 and limited by a Zener diode limiter 208. The timing pulses are then further amplified by circuitry 210 and passed through a first inverting logic gate so as to be suitable for application to transistor-transistor logic circuitry. The circuit elements 204, 206, 208, and 210 together form a conventional 8 megacycle oscillator the details of which are not critical to the present invention. The 8 megacycle signal is fed to the horizontal counter 600 shown in FIG. 6A.

To synchronize the 8 megacycle signal with the termination of each horizontal blanking interval, a blanking signal accompanying the video signal is applied to an input amplifier 202 and is used to gate or to control the operation of the oscillator 204. During all blanking intervals, the oscillator 204 is disabled by the blanking signal. At the onset of each horizontal scanning line, the blanking signal terminates and allows the oscillator 204 to commence oscillations. The commencement of oscillations is thus synchronized with the termination of each horizontal blanking interval. If no source of blanking signal is available, a synchronizing signal may be used in its place, and the circuit may be modified accordingly.

With reference to the central portion of FIG. 2, circutry is shown which prepares a synchronizing signal for use by several sections of the generator. The synchronizing signal input is first reshaped by a conventional input pulse regenerator 112. The pulse regenerator 212 cleans up the SYNC signal by first amplifying and clipping the SYNC signal and by then applying the signal to a conventional Schmitt trigger circuit. The output of the pulse regenerator 212 is converted to standard logic levels by an amplifier 216 and is supplied to FIG. 5C as a SYNC (synchronizing) signal. The SYNC signal is used to control the operation of the vertical control 560. The output of the pulse regenerator 212 is also integrated by an integrating operational amplifier 218 and is then converted into a !VERT signal which is present during vertical synchronizing pulse intervals and absent at other times. The VERT signal is differentiated by an R-C differentiating circuit 220 and is converted into a logic level FRAME Z pulse which occurs at the start of each vertical synchronizing pulse. The VERT signal is used in FIG. 3 to control the operation of the lever counting circuit, and the FRAME pulse is used in FIG. 5C to control the operation of the vertical control 560.

The incoming blanking signal is passed through an input pulse regenerator 214 that is structurally identical to the regenerator 212. The regenerated blanking signal is amplified by an amplifier 222 and is supplied to the output switch 800 which appears in FIG. 8A to add stable, transient-free blanking to the video output generated in FIG. 11A. This blanking circuit, while desirable, may be omitted or replaced with a similar circuit that operates under the control of a synchronizing signal.

ANALOG-TO-DIGITAL CONVERTER

The analog-to-digital converter 300 which converts an analog signal generated by the lever control 101 (FIG. 1) into a digital pulse signal is shown in FIG. 3. The converter 300 accepts as an input a D.C. signal from the lever control 101 which fluctuates between zero and −7 volts depending upon the setting of the lever control 101. The converter 300 also accepts as an input the vertical synchronizing pulses VERT from the synchronous clock 200. The converter 300 generates two output signals. A divide by N output signal is a pulse signal. During each vertical scanning interval, this pulse signal includes a number of pulses that is proportional to the analog signal which is received from the lever control 101. A LEVER GATE signal is also generated during the vertical retrace period when the analog-to-digital converter 300 is reset. This LEVER GATE signal is supplied to the lever counter 400 for reasons which are explained below.

The converter 300 includes basically a source of pulses, a pulse integrator, and a comparator for comparing the output of the pulse integrator with the analog signal from the lever control. The pulse source comprises basically a unijunction transistor oscillator 304 which generates approximately 20 pulses during each horizontal scanning line. A clamping circuit 302 disables the unijunction oscillator when the VERT signal is present and thus synchronizes the initial generation of pulses by the oscillator 304 with the beginning of each vertical scan. The pulses are amplified, limited, and applied to the input of a one-shot multivibrator 306. Approximately 20 pulses per horizontal line thus appear at the output of the multivibrator 306. These pulses normally pass through a gate 328 and comprise the divide by N pulse signal.

The output of the multivibrator 306 is also passed through a limiter 308 which is used to control the actuation of a constant current source 310. In response to each pulse generated by the multivibrator 306, a unit amount of current passes from the current source 310 into a storage capacitor 312. The capacitor 312 thus integrates this current over time and develops an analog voltage whose magnitude is proportional to the number of pulses which have been generated independent of pulse frequency. During each vertical retrace interval, the VERT signal causes a transistor switch 314 to discharge the capacitor 312. Hence, the development of the analog signal across the integrating capacitor 312 is initiated anew at the beginning of each vertical scan interval.

The analog direct current signal from the lever control 101 is fed into an operational amplifier 320. The purpose of the operational amplifier 320 is to convert the level of this direct current signal from negative to positive and also to invert this signal. Hence, while the potential generated by the lever control fluctuates between zero and −7 volts, potential at the output of the operational amplifier 320 fluctuates from zero to +7 volts.

A comparator 318 compares the magnitude of the zero to +7 volt lever control signal with the magnitude of the analog voltage developed across the integrating capacitor 312. The voltage across the capacitor 312 is isolated from the comparator 318 input by a unity-gain transistor amplifier 316 having a high impedance input. The amplifier 316 causes negligible current loss from the capacitor 312. The output signal generated by the comparator 318 is used to control the passage of the pulse signal through the gate 328. When the comparator 318 output is positive, pulses pass freely from the one-shot multivibrator 306 into the divide by N signal. When the output of the comparator 318 is negative or at ground level, the gate 328 is disabled, and the divide by N pulse signal terminates.

At the beginning of each vertical scanning cycle, the integrator capacitor 312 is discharged to zero volts and the unijunction oscillator 304 is started at the end of the vertical synchronizing pulse. Assuming that the signal from the lever control 101 is somewhere between zero and −7 volts, a positive potential exists at the output of the amplifier 320. The comparator 318 compares this positive level signal with the (approximately) zero level signal presented by the integrating capacitor 312. Since the potential at the output of the amplifier 320 is positive of that presented by the capacitor 312, the operational amplifier 318 enables the gate 328 to pass pulses from the one-shot multivibrator 306 into the divide by N signal. Hence, pulses begin appearing on the divide by N signal line. As each pulse is generated, the constant current source 310 applies an increment of charge to the integrating capacitor 312. Hence, the voltage across the capacitor 312 gradually rises and approaches the magnitude of the voltage which appears at the output of the operational amplifier 320. At some time during the vertical scanning cycle, the voltage across the integrating capacitor 312 becomes more positive than that which appears at the output of the amplifier 320. The output of the comparator 318 then disables the gate 328 and prevents any further pulses from passing into the divide by N signal. Hence, the number of pulses which appear in the divide by N signal during each vertical scanning interval is determined by the number of current pulses which are required to charge the capacitor 312 so that it presents a higher potential level than is present at the output of the amplifier 320. Since the voltage across the capacitor 312 rises linearly at a constant rate, the number of pulses supplied to the divide by N signal is proportional to the magnitude of the voltage at the output of the amplifier 320 which in turn is proportional to the magnitude of the signal that is supplied by the lever control 101. Hence, the number of pulses which appear in the divide by N signal is proportional to the position of the lever control 101.

To prevent spurious pulses from appearing at the output of the gate 328 while the converter 300 is reset, the VERT signal causes a one-shot multivibrator 326 to disable the gate 328 while the resetting operation takes place. The output of the multivibrator 326 is also supplied to the circuitry shown in FIG. 4 in the form of a LEVER GATE signal.

LEVER COUNTER

A block diagram of the lever counter 400 is presented in FIG. 4A. The lever counter 400 counts the pulses in the divide by N signal during each vertical scanning interval and stores this count in a latch or storage register 418 during each vertical retrace interval. The output of the latch 418 is supplied to the diagonal adder 680 and to the vertical comparator 530 both of which are shown in FIG. 1. The output of the latch 418 is the lever count or lever number—a digital number whose magnitude is proportional to the positioning of the lever control 101 during the immediately preceding vertical scan interval.

The divide by N signal is a pulse signal which contains anywhere from the zero to a maximum of approximately 5,120 pulses per vertical scanning interval. Depending upon the particular special effect which is being produced, it is desirable to vary the range of counts which may appear at the output of the latch 418. For example, some special effects require the latch 418 output to vary from a count of zero to a count of 32 for a complete actuation of the lever control 101 from one end of its range to the other, whereas other special effects require a count which varies from 0 to 1,024. Control signals from FIG. 9 are therefore supplied to the lever counter 400 to program the counter.

The divide by N signal is fed to the input of a variable mod or variable radix counter 402. The output of the counter 402 is fed either into the up or the down count input of a presentable up/down counter 416. The count output of the counter 416 is fed directly into the latch 418.

The variable mod counter 402 is a counter which generates one output pulse for every N input pulse, where N is a number which may be varied in accordance with control signals generated in FIG. 9. For example, when the signal 1,024 is present, the variable mod counter generates one output pulse for every five input pulses (N=5). Hence, if the lever control 101 is in such a position that 5,120 pulses are supplied to the variable mod counter 402 by the divide by N signal, then the counter 402 generates 5,120 divided by 5 or 1,024 output pulses. These pulses are counted by the presentable up/down counter 416 and are presented to the latch 418. Hence, when the signal 1,024 is present, the variable mod counter 402 modifies the divide by N signal so that the range of counts which may be presented by the up/down counter 416 to the latch 418 is limited to the range of from 0 to 1,024. In a similar manner, other control signals from FIG. 9 program the variable mod counter 402 to limit the count which may be presented by the counter 416 and to the latch 418 to other values. If the control signal 64 is present, for example, the variable mod counter 402 generates one output pulse for every 80 input pulses (N=80). With the maximum possible number of input divide by N pulses equal to 5,120, the maximum number of output pulses generated by the counter 402 is 64. Hence, the counter 416 is limited to counting from zero to 64. In a similar manner, all of the control signals 32, 64, 256, 320, 512, and 1,024 can reprogram the variable mod counter 402 in such a manner that the counter 416 is limited to the range of from zero to the values 32, 64, . . . , or 1,024, depending upon which control signal is present.

Referring once again to FIG. 1, the output polarity control 850 generates an N/R signal which reprograms the digital special effects generator to generate reverse wipes. One of the functions of this signal is to reverse the direction in which the counter 416 counts. When the signal N/R is present, the signal N/R enables a gate 410 and disables a gate 408, and thus causes the output of the variable mod counter 402 to be fed into the DOWN input of the the counter 416. The signal N/R also enables the gate 412 and disables the gate 414 and thus causes a pulse signal from a one-shot multivibrator 406 to load a preset value into the counter 416 at the beginning of each vertical scan interval. The preset value which is loaded is determined by which of the control signals 32, 64, . . . , 1,024 from FIG. 9 is present. For example, if the control signal 32 is present, then the preset value 32 is loaded into the counter 416. Hence, when the N/R signal is present, the counter 416 counts down from a value equal to the name of the incoming control signal towards zero in response to the divide by N signal.

When the N/R signal is not present, the absence of this signal causes the output from the variable mod counter 402 to pass through the gate 408 to the UP input of the counter 416. The output pulse from the multivibrator 406 is routed through the gate 414 to the CLEAR input of the counter 416. Hence, when the N/R signal is absent, the counter 416 counts upwards from zero count. In this manner, the counting direction of the counter 400 is controlled by the N/R signal.

The LEVER GATE signal generated in FIG. 3 is used to reset the counter 400 during each vertical retrace interval. In response to the LEVER GATE signal, the one-shot multivibrator 404 generates a HOLD pulse which is fed to a load terminal of the latch 418. This HOLD pulse causes the output of the counter 416 to be transferred into the latch 418 and to be presented as a LEVER COUNT output signal. When the output signal from the multivibrator 404 terminates, a one-shot multivibrator 406 generates a pulse which clears the variable mod counter 402 and either loads or clears the counter 416, depending upon which of the gates 412 or 414 is enabled by the N/R signal. Hence, during each vertical retrace period, a new count is transferred into the latch 418 and the counter elements are cleared for the reception of the next series of pulses from the divide by N signal.

VARIABLE MOD COUNTER

FIG. 4B is a logic diagram which illustrates the details of the variable mod counter 402. The variable mod counter 402 consists of four counting stages connected in series each of which may be independently disabled. A first divide-by-4 counting stage comprises a pair of flip-flops 434 and 436, and an identical second divide-by-4 counting stage comprises a pair of flip-flops 438 and 440. The divide-by-4 counting stages are conventional ripple counters in which the Q output of one flip-flop is connected to the toggle or T input of the next. The J and K inputs of the flip-flops, which are not shown, are assumed to be strapped positive or not connected so as to cause the flip-flops to toggle each time the signal at their T inputs drops from high to low. A divide-by-2 counting stage comprises the single flip-flop 442. A divide-by-5 counting stage comprises the three flip-flops 444, 446, and 448. These three flip-flops are interconnected in shift register fashion. However, the J input to the flip-flop 444 is connected to the inverted Q output of the flip-flop 448 and the K input to the flip-flop 444 is connected to the Q output of the flip-flop 446. The resultant shift register configuration resets itself completely after a count of 5 is reached.

The individual counting stages just described are interconnected by gates 450, 452, 454, and 456 into a single counter. Each of the gates 450, 452, 454, and 456 accepts as an input the output or count pulses from the preceding counting stage or, in the case of the gate 450, from the divide by N signal. The remaining inputs to the gates 450, 452, 454, and 456 come from the inverted Q outputs of the associated stage flip-flops.

Hence, the gate 450, 452, 454, and 456 are only enabled to pass a counting pulse from a prior stage to the next counting stage when the associated flip-flops are all cleared. This happens once during each counting cycle for each of the counting stages. Hence, each counting stage passes one pulse on to the next counting stage each time it passes through its complete counting cycle.

Through the use of the gates 450, 452, 454, and 456, it is possible to eliminate any of the four counting stages from the variable mod counter 402 by simply locking the associated flip-flops in a cleared state so that they continuously enable the associated gate 450, 452, 454, or 456 to pass counting pulses. For example, when the two flip-flops 434 and 436 are held in a cleared state by an inverted signal at the output of the gate 422, the inverted Q outputs of these flip-flops enable the gate 450 to pass all of the divide by N signal pulses to the input of the next counting stage. If the gate 422 presents a high level signal, the flip-flops 434 and 436 are free to toggle. They then block the gate 400 from passing three out of every four pulses in the divide by N signal. The other counter stages shown in FIG. 4B behave in a similar manner. Hence, a wide variety of different counts may be achieved by simply grounding different groups of flip-flops within the variable mod counter 402. The mod or radix number of the counter 402 is defined as the number of input divide by N pulses which are required to generate a single output pulse.

The control signal from FIG. 9 are fed through a series of logic gate inputs to the clear terminals of the flip-flops. Each control signal is connected in such a manner that it programs the variable mod counter 402 to a particular mod or radix number. The control signals are normally high, and they go low in response to the actuation of special effect push buttons 910 shown in FIGS. 9 and 12.

When the control signal 1,024 goes low, a gate 424 is disabled and generates a high level signal. This high level signal is applied by a gate 426 to the clear terminals of the flip-flops 438 and 440. Hence, the divide-by-4 counting stage comprising the flip-flops 438 and 440 is disabled. The absence of any of the other control signals disables all of the other counting stages except for the divide-by-5 counting stage which comprises the flip-flops 444, 446, and 448. The high level 32, 64, and 320 control signals together cause an output signal from a gate 420 to pass through a gate 422 and disable the divide-by-4 counting stage comprising the flip-flop 434 and 436. The absence of the signals 32 and 512 causes a signal to flow from the output of the gate 428 and through a gate 430 to disable the divide-by-2 counting stage flip-flop 442. The high level 320 signal causes a low level signal to be applied to the gate 432, and hence a high level signal flows from the gate 432 and enables the divide-by-5 counting stage to function in a normal manner. Hence, the mod of the counter 402 is set at 5 in response to the 1,024 signal. The lever counting range is thus limted to from 0 to 1,024 with a maximum possible divide by N signal input of 5,120 pulses.

When the 512 control signal is at ground level, the variable mod counter 402 is programmed basically in the same manner as it is when the 1,024 signal is at ground level except that the gate 428 is disabled and generates a low level output signal. The gate 430 then generates a high level output signal which enables the divide-by-2 counting stage comprising the flip-flop 442 to function. Hence, the variable mod counter 402 functions as a divide by 10 counter with a mod or radix number of 10. The lever counter output is thus limited to the range of from 0 to 512 in response to a maximum possible 5,120 input pulses from the divide by N signal.

When the control signal 320 is at ground level, a high level signal at the input to the gate 432 disables the divide by 5 counting stage. The gate 420 is disabled by the ground level 320 signal, and hence the gate 422 no longer disables the divide-by-4 counting stage comprising the flip-flops 434 and 436. Since both the control signals 512 and 1,024 are at a high level, the gate 424 generates a low level signal output. In response to this low level signal, the gate 426 generates a high level signal and allows the divide-by-4 counting stage comprising the flip-flops 438 and 440 to function. The presence of both of the high level signals 32 and 512 disables the divide-by-2 counting stage, as has already been explained. Hence, the counter mod number is set at 16. The range of the lever counter output is then limited to 320 for a maximum possible number of input pulses equal to 5,120.

When the control signal 64 signal goes low, the divide-by-2 counting stage (flip-flop 442) remains disabled, but all other counting stages are allowed to function in their normal manner. The variable mod counter 402 then resets itself when it reaches a count of 80 input pulses. Hence, the lever counter output is limited to a range of from zero to 64 in response to a maximum possible number of input pulses equal to 5,120.

When the control signal 32 goes low, all of the counting stages are allowed to function, and the counter functions as a divide-by-160 counter. The lever counter range is then limited to from 0 to 32.

UP/DOWN COUNTER AND LATCH

The details of the up/down counter 416 and of the latch 418 are shown in FIG. 4C. Incoming control signals 32, 64, . . . , and 1,024 are interconnected through gates to preset inputs IN of the counter 416 stages 466, 468, and 470 in such a manner that when a load pulse is supplied to the counter 416 by a gate 460, the desired count value is loaded into the counter. The logic gates 450, 452, 454, and 456 simply serve to allow two or more of the control signals to be fed into a single preset input terminal of the counter 416.

The counter 416 comprises three 4-bit binary counter stages 466, 468, and 470. Each of the three counter stages has an up-count input U and a down-count input D and a similar set of outputs (unlabeled). The three counter stages are interconnected as is shown in the figure to form a single twelve-bit counter. A low level signal applied to the terminals L (load) of the counter stages causes a preset value to be loaded into the counter, and a high level signal applied to the terminals C (clear) of the counter stages causes the counters to be cleared to zero count.

Ten of the counter output lines OUT are connected to the inputs IN of the latch 418. The latch 418 comprises three stages 472, 474, and 476. Each stage of the latch includes four storage registers, and pairs of these storage registers share a common load terminal marked L. All of the load terminals L are connected together and to a HOLD signal line which comes from FIG. 4A. In response to a HOLD pulse, the binary number displayed by the least significant ten bits of the counter 416 is transferred into the latch 418 and is presented as a LEVER COUNT signal on lines zero through nine.

While the normal counting range of the counter 416 is limited by the variable mod counter discussed above to 0–32, 0–64 . . . , or 0–1,024, depending upon which control signal 32, 64 . . . , or 1,024 is present. However, more than 5,120 pulses may occasionally flow from the divide by N signal and cause the counter 416 to advance too far. To prevent this from happening, various protecting circuits are shown in FIG. 4C which either prevent the count from going past zero to a negative count or which prevent the count from going positive past a particular value. If the count goes down from zero, the most significant output terminal of the counter stage 466 goes to a high signal level. As in the case of an inexpensive addlng machine where 0 minus 1 is 999,999, when the counter 416 counts down past zero, the counter 416 output goes from 000,000,000 to 111,111,111,111 and causes the most significant output terminal to present a high level signal. This hlgh level signal passes though a gate 462 to the counter 416 clear input terminal C and thus resets the counter 416 back to zero count. Hence, the counter count may not count down past zero count. Similarly, if the count advances from 1,023 to 1,024, the second from the most significant counter output terminal generates a high level signal which passes through a pair of gates 464 and 460 and causes a preset value to be loaded into the counter, usually the value 1,023. Hence, the counter output may not exceed 1,023. The purpose of the gate 464 is to prevent any such resetting action when the counter 416 is counting in a downwards direction as indicated by the N/R (normal/reverse) signal. The second least significant bit output terminal of the counter stage 466 is fed through a pair of gates 459 and 460 to the load terminals of the counter 416 whenever the gate 459 is enabled by the control signal 512 which passes through the gate 458. The counter 41 is thus prevented from advancing past the count of 511 when the 512 control signal is present. The gate 458, which in the preferred embodiment of the invention is also the gate 428 shown in FIG. 4B, serves in FIG. 4C merely as an inverter for the signal 512. The addition of the control signal 32 to an input this gate 458 has a function in FIG. 4B (where the gate is labeled 428) but has no operational function in FIG. 4C.

VERTICAL COUNTER

FIG. 5A discloses the details of the vertical counter 500. The vertical counter 500 comprises the two counter stages 518 and 520. The counters 518 and 520 generate the 8 most significant bits of the VERTICAL COUNT signal. The least significant bit of this signal is generated by the vertical control circuitry shown in FIG. 5C and is either a zero or a one bit depending upon what interlace field is being scanned. By way of further explanation, every video frame comprises two interlaced fields of 252½ lines each. The horizontal lines of one field are positioned midway between the horizontal lines of the immediately preceding and following fields to form a complete picture or frame of 525 lines. The vertical count advances a unit amount for each line in a frame. If the vertical count is even (2, 4, 6, . . . ) during one field, the vertical count is odd (1, 3, 5, . . . ) during the next field. Hence, the least significant digit of the vertical count is usually most conveniently generated by a device which senses which field is being generated rather than by the vertical counter 500. A cost savings is also achieved, since the vertical counter 500 needs only to have 8 stages rather than 9.

The vertical counter 500 includes both up and down count inputs. One or the other of these inputs is enabled by a bistable 504 which enables and disables alternate ones of the two input gates 514 and 516. The bistable 504 is initially set at the beginning of each vertical scan by the presence of a V.DWN. (vertical down) control signal or is initially cleared by the absence of the V.DWN. control signal. A start pulse called the ALPHA signal enables the two gates 502 and 506 to either set or clear the bistable 504 in accordance with the state of the V.DWN. signal. The ALPHA start signal also loads the counter 500, since it is applied to the load terminals L of the counter stages 518 and 520. The particular value which is loaded into the counter is either zero or some count value which is determined by the presence or absence of CIRCLE and V.PRESET (vertical preset) control signals both of which are generated in FIG. 9. When both the V.PRESET and the CIRCLE control signals are at ground level, the initial effective vertical count is 320 (160 in the counter stages 518 and 520; the effective count is 320 because the stages 518 and 520 do not generate the least significant bit of the vertical count). When just the CIRCLE control signal is present, the initial count is 64. When just the V.PRESET control signal is present, the inilial count is 256.

If the vertical counter 500 is programmed to count in the downwards direction, the counter is shifted to count in an upwards direction by a zero detecting gate 522 when the counter reaches zero count. An output signal generated by the gate 522 enables a gate 512 to pass a BETA timing signal into the bistable 504 to reset the bistable 504 and to reverse the direction of count.

When the vertical counter 500 is counting in an upwards direction, the direction of count may be reversed at a particular count if desired. In the preferred embodiment, the absence of a V.TRI. (vertical triangle) control signal enables not only the zero detecting gate 522 but also a gate 510 which couples the most significant bit output of the stage 520 back to an input of the bistable 504. Hence, when a vertical count of 256 is reached, the gate 510 resets the counter to count in a downward direction and prevents the count from exceeding 256. When the V.TRI. control signal from FIG. 9 is present and at a low level, both the gate 510 and the zero detection gate 522 are disabled and are unable to reset the bistable 504. Similarly, when a V.MULT. (multiple vertical count) signal is at ground level, the gate 508 is enabled to reset the bistable 504 when a count of 32 is reached, thus causing the count to proceed in the downwards direction whenever the count reaches 32. This ability is desirable for a number of venetian blind and mosaic special effects in which repeated patterns are generated and spaced vertically along an output image.

The actual counting signals for the vertical counter 500 are BETA and GAMMA signals which come from the vertical control shown in FIG. 5C. These signals appear only during horizontal retrace intervals, and hence the vertical counter output is stable during each horizontal sweep. The actual vertical count signal is the GAMMA signal. The BETA signal, when it is operational, fluctuates at half the frequency of the GAMMA signal and prevents every other GAMMA pulse from passing through either of the gates 514 or 516. The particular gate 514 or 516 to which each GAMMA pulse is passed is determined by the bistable 504 which controls the direction of count.

VERTICAL COMPARATOR

The vertical comparator 530 is shown in FIG. 5B. The vertical comparator comprises basically a pair of comparator stages 544 and 546. Each of the comparator stages 544 and 546 has a pair of outputs which indicate which one of its inputs A or B is greater. The outputs of the comparator stage 544 are fed into the least significant bit input terminals of the comparator stage 546, and the "A less than B" output of the comparator 546 is the V.COMP. (vertical comparison) signal which indicates whether the lever count or the vertical count is greater.

The vertical counter output is fed into the eight most significant available A inputs to the comparator stages 544 and 546, and a FRAME signal which changes its stage after the generation of each interlace field is fed into the least significant A input to the comparator stage 544. The nine least significant bits 0–8 of the lever count are fed into the B inputs of the comparator stages 544 and 546, and the most significant bit 9 of the lever count is used to inhibit or to disable the comparator stages whenever the lever count reaches a count of 512 or greater.

The FRAME signal generated in FIG. 5C is present during one interlace field and is absent during the next. Whether this FRAME signal is to be added directly or inverted form to the vertical count as the least significant bit depends upon whether the vertical counter 500 is counting in an upwards drection or in a downwards direction. If the vertical counter 500 is counting in a downwards direction, a V.UP signal from the bistable 504 (FIG. 5A) is absent, and the FRAME signal passes through the gates 532, 536, and 538 to the least significant A input of the comparator 530. In this case, the FRAME signal is not inverted. If the vertical counter 500 is counting in an upwards direction, the V.UP signal from the bistable 504 is present and causes the FRAME signal to pass through the gates 534, 536, and 538. In this case, the FRAME signal is inverted before it is applied to the least significant A input of the comparator 530. The FRAME signal, as modified by the V.UP signal, also passes through a gate 542 to the diagonal adder 680 shown in FIG. 6B and serves as the least significant bit of the vertical count input to the adder 680. Whether the frame signal is routed to the vertical comparator 530 or to the diagonal adder 680 is controlled by an output signal from a gate 540. If the CIRCLE control signal is at a high level or absent and if the DIAG. (diagonal) signal is at a low level or present, then the FRAME signal is routed through the gate 542 to the diagonal adder so that the generator is programmed to produce diagonal wipes and special effects. In all other cases, the output of the gate 540 is high and causes the FRAME signal to be routed into the vertical comparator 530.

VERTICAL CONTROL

The vertical control 560 is shown in FIG. 5C. Together with the synchronous clock 200 shown in FIG. 2, the vertical control 560 is the major synchronizing piece of hardware within the special effects generator 100. The vertical control 560 generates the signals ALPHA, BETA and GAMMA which control the operation of the vertical counter 500 shown in FIG. 5A. In addition, the vertical control 560 generates the FRAME signal which adds one to the vertical count during alternate fields and an H. PRESET signal which loads and starts the horizontal counter 600 (FIG. 6A) at the beginning of each horizontal scanning line. Hence, the vertical control 560 controls the operation of the horizontal counter as well as the vertical counter.

The vertical counter advance signal is a pulse signal GAMMA which is generated by the vertical control 560. Typically, the signal GAMMA contains one pulse for each horizontal sync pulse. Each horizontal sync pulse supplied by the signal SYNC from FIG. 2 passes through gates 568, 578, 597 and 599 to the GAMMA signal. During circular and elliptical effects, each sync pulse is also delayed by passage through the gate 572 and the one-shot multivibrators 575, 576 and 574 and the resultant delayed pulses pass through the gates 578, 597 and 599 and also become part of the GAMMA signal. More particularly, when the SYNC signal goes negative, an inverted output of the one-shot multivibrator 575 goes negative and immediately triggers the second one-shot multivibrator 576. The non-inverted output of the one-shot multivibrator 576 passes through a gate 572 and is applied to the input of the one-shot multivibrator 574. The non-inverted output of the multivibrator 576 goes positive for roughly 8 microseconds and then goes negative and triggers the multivibrator 574. The time constant of the multivibrator 574 is set to about half a microsecond to generate a short pulse. Hence, the gate 578 can receive two horizontal sync pulses — one from the gate 568 which corresponds to the presentation of a horizontal sync pulse by the SYNC signal, and one from the multivibrator 574 which occurs only during circular or elliptical effects. These two horizontal sync pulses normally form the GAMMA signal and cause the vertical counter 500 to normally advance one count during each horizontal blanking interval. The GAMMA signal may also be modified in ways which are described below.

When circular, elliptical, and triangular special effects are generated, the vertical counter is programmed to count in response to every other GAMMA signal pulse. For other effects, every GAMMA signal pulse is counted. With reference to FIG. 5A, both the GAMMA signal and and BETA signal are applied to the gates 514 and 516. The BETA signal is generated by a flip-flop 596 shown in FIG. 5C. The toggle input to the flip-flop 596 is connected to the GAMMA signal, and hence the flip-flop 596 can function as a divide-by-2 counter generating extended-length BETA pulses corresponding to every other GAMMA pulse. So long as the flip-flop 596 is free to toggle, the BETA signal blocks every other GAMMA pulse from passing through the gates 514 and 516 in FIG. 5A and thus causes the vertical counter 500 to count just every other GAMMA pulse.

The BETA signal is only generated in this manner during the generation of circular special effects or triangular special effects. Both the CIRCLE and the TRI. (triangle) control signals from FIG. 9 are fed into a gate 588 the output of which is connected to the K input of the flip-flop 596. The J input to the flip-flop 596 may be assumed to be connected to a positive potential source. When both of the control signals CIRCLE and TRI. are high or absent, the output of the gate 588 disables the flip-flop 596 and causes the BETA signal to be continuously generated so that the gates 514 and 516 in FIG. 5A are continuously enabled to pass all GAMMA pulses. If either the CIRCLE signal or the TRI. signal is low and present, the gate 588 enables the flip-flop 596 to toggle and to delete every other GAMMA pulse at the input to the gates 514 and 516.

The present invention contemplates that both circular and elliptical special effects may be generated. An elliptical special effect is generated naturally because of the three-to-four aspect ratio of the video image (a standard video image is 3 units high and 4 units wide). To generate a circular special effect, it is necessary to delete one out of every four pulse inputs to the vertical counter so that the vertical counter advances at only three quarters the rate at which the horizontal counter advances. This function is achieved by a pair of flip-flops 592 and 594 which together function as a divide-by-4 counter. The toggle input to the flip-flop 592 receives counting pulses from the gate 578. The Q output of the flip-flop 592 connects to the toggle input of the flip-flop 594 in ripple-counter fashion. The flip-flops 592 and 594 count continuously in response to pulses appearing at the output of the gate 578. When both of the flip-flops 592 and 592 are cleared, their inverted Q outputs together cause a gate 598 to disable the gate 597 from passing one pulse into the GAMMA signal. The flip-flops are both cleared once for every four pulses which appear at the output of the gate 578, and hence one out of every four pulses is prevented from passing through the gate 597. This pulse deletion operation may only function so long as the J and K inputs of the flip-flops 592 and 594 are all positive. To disable this function, the K input of the flip-flop 592 may be supplied with a low level signal by a gate 590. The inputs to the gate 590 are an inverted CIRCLE control signal and a non-inverted ¾ OFF control signal. During circular special effects, the CIRCLE control signal goes low and the ¾ OFF control signal remains high. The gate 590 is then enabled to supply a positive level potential to the K input of the flip-flop 592 and to initiate the deletion of every fourth pulse. If an elliptical special effect is desired, the ¾ OFF control signal is held low to disable the gate 590 and the divide-by-4 counter. The divide-by-4 counter is also disabled by a high level CIRCLE control signal and is thus only used during the generation of circular or elliptical special effects.

The circuitry which resets and initializes both the horizontal and the vertical counters appears in FIG. 5C. The vertical counter 500 is cleared to zero (or preset) by a signal ALPHA that is generated by a flip-flop 562. At the end of each video field, the FRAME pulse generated in FIG. 2 causes a one-shot multivibrator 577 to generate an output signal which endures for a variable time which may be adjusted within the range of about one to ten milliseconds. The one-shot output signal enables the J input of the flip-flop 562 and thus enables the flip-flop 562 to toggle in response to the incoming SYNC pulses. The signal ALPHA is then the Q output of the flip-flop 562. So long as the flip-flop 562 continues to toggle, the vertical counter 500 is held at a zero or at a preset count and is not permitted to operate. When the time delay of the multivibrator 577 expires, the J input to the flip-flop 562 goes low. Hence, the next time the flip-flop 562 returns to a cleared state, the flip-flop 562 remains cleared until the end of the next field. The ALPHA signal thus terminates and the vertical counter is permitted to begin counting. The time constant or delay time of the multivibrator 577 determines when the vertical counter 500 is placed into operation and thus determines the vertical centering of the special effects.

The one-shot multivibrator 576 determines the horizontal centering of a special effect. An inverted output of the multivibrator 576 is a H. PRESET (horizontal preset) signal which is used to load and to start the horizontal counter 600 at the beginning of each horizontal scanning line. The one-shot multivibrator 576 commences generating the horizontal preset signal synchronously with an incoming SYNC signal pulse and terminates this signal after the expiration of the multivibrator 576 time constant or time delay which may be varied around the value of 8 microseconds.

A flip-flop 566 indicates whether the first or second interlace field of a frame is being generated. As has already been explained, each complete frame of a video image includes two fields which interlace with one another. The flip-flop 566 determines which of the two fields is being generated so that the least significant bit of the effective vertical count may be adjusted accordingly, as has also been explained. The flip-flop 566 makes this determination and generates a FRAME signal. The FRAME signal is fed into the vertical comparator 530 (FIG. 5B) where it serves as a least significant digit of the vertical count, as has been explained. During circular and elliptical effects, the flip-flops 566 and 564 prevent one delayed sync pulse from entering the GAMMA signal during alternate frames by causing a gate 570 to disable the gate 572 during alternate frames.

In accordance with conventional video signal standards, these horizontal synchronizing pulses are generated at the start of each horizontal scanning line. These pulses are also generated at the middle of each horizontal scanning line during vertical blanking intervals. The one-shot multivibrator 575 has a time constant of roughly 33 microseconds which encompasses slightly more than one-half of the time required to complete a horizontal scan. As SYNC pulses are applied to the input of the multivibrator 575, the output of the multivibrator 575 is a pulse which endures for slightly more than half of each horizontal scanning line, and hence the output of the one-shot multivibrator 575 is high when any middle-of-the-horizontal-scanning-line SYNC pulse occurs. Because the multivibrator 575 is not reset when a middle-of-the-horizontal-scanning-line SYNC pulse occurs, the multivibrator 575 is not triggered by middle-of-the-scanning-line SYNC pulses but responds only to SYNC pulses which occur at the beginning of horizontal scanning lines.

As was just mentioned, the normal and the inverted outputs of the multivibrator 575 are respectively applied to the J and K inputs of the flip-flop 566. The FRAME pulse is generated by the circuitry shown in FIG. 2 which has already been explained. This circuitry integrates the synchronizing signal to obtain a vertical sync pulse and then differentiate this sync pulse to give the FRAME pulse. Hence, the precise timing of the FRAME pulse during the generation of each field depends upon precisely when the vertical synchronizing pulse for the field begins in the synchronizing signal. In order to achieve frame interlacing, a video signal shifts the timing of alternate vertical synchronizing pulses from one frame to the next by a time which corresponds to one-half a horizontal scan. Hence, the timing of successive vertical synchronizing pulses with respect to the horizontal blanking signals varies from in-phase to one-half line out-of-phase from one frame to the next. The output of the one-shot multivibrator 575 is high for half of each horizontal scan and is low for the remaining half of each horizontal scan and is synchronized with the horizontal blanking signals. Hence, a comparison of the phase of the squarewave generated by the one-shot multivibrator 575 with the precise timing of the FRAME pulse can differentiate one interlace field from the next. The flip-flop 566 performs this phase comparison, since it is toggled by the FRAME pulse into a state which is controlled by the state of the one-shot multivibrator 575 when the FRAME pulse occurs. The output of the flip-flop 566 thus indicates which interlace field of a frame is being generated and may be used as the least significant digit of the effective vertical count.

The preferred embodiment of the invention is able to generate a large number of special effects using a minimum number of hardware components. The generation of circular, elliptical, and linear wipe effects call for an intricate balancing of different hardware components so as to achieve all of the different effects with a minimum of switching circuits and with a minimum of extra components.

The circuitry which controls the programming of the vertical counter to achieve different special effects is primarily shown in FIG. 5C. In brief, this circuitry comprises: the flip-flops 592 and 594 which may delete every fourth input count to the vertical counter; the flip-flop 596 which may delete every other input count to the vertical counter; a series of gates 580, 582, 584 and 586 which function under the control of a flip-flop 564 to advance the vertical counter at a higher rate of speed during an early horizontal scanning line of each field; and the control signals listed at the left edge of FIG. 5C which control the operation of this circuitry.

Special problems are caused by the particular way in which the present invention achieves a circular wipe effect. As explained above, the preferred embodiment of the present invention initiates operation of the vertical squarer circuit when the vertical count equals the lever count. In terms of the imaginary circle which separates two images, the lever count represents the radius of this circle. In order for the circuit to be fully effective, it is necessary that the logic circuitry be capable of generating a vertical count equal to the largest conceivable radius which may be encountered — namely, the distance from the center of the output image to a corner of that image. The horizontal counter breaks up the distance between the center of an image and the left or right side of the image into 256 segments. Since the ratio of the width of an image to the height of an image is 3 to 2, the distance from the center of an image to a corner is 340 units and the distance from the center of an image to the top is 192 units. At first blush, then, it would appear that the vertical counter must be preset to count down from 192 to zero at midscreen. Hence, the vertical counter would appear to require the equivalent of 384 counts per vertical scan. However, if the invention were constructed in this manner, then it would be impossible to start the vertical squarer at a time when the vertical counter and the lever counter presented equal values and when the lever counter is presenting a count greater than 192. In order to handle the situation when an image segment A fills almost an entire image and an image segment B only occupies small areas at the image corners, it is necessary to let the lever counter produce a maximum count of 320 which corresponds to a radius of 320 units. If the maximum count reached by the vertical counter is only 192, it is clear that these two counts can never equal one another.

To overcome this, the vertical counter is started out initially at a count of 320 during circular wipes by actuation of the control signals V. PRESET and CIRCLE in FIG. 5A. During a single horizontal scanning line interval, the equivalent of 128 counts are supplied to the vertical counter to bring the count presented by the vertical counter down to 192. During the time it takes for half a video field to be generated, additional SYNC and delayed SYNC pulses are supplied to the vertical counter spaced out in time so that the counter reaches zero count when the scan reaches the middle of the video field. Assuming that the output of the lever counter is limited to the range from zero to 320, then some vertical count may always be reached at which the lever counter and the vertical counter are presenting the same value and at which count the vertical squarer may be placed into operation.

With reference to FIG. 5C, the vertical counter is loaded and placed into operation when the ALPHA signal terminates for the last time at the beginning of the scanning of a frame. It will be remembered that the flip-flop 562 toggles so long as the one-shot multivibrator 577 continues to generate an output signal. When that output signal terminates, the flip-flop 562 toggles one last time from the set state to the cleared state and then remains cleared. This toggling is controlled by the SYNC signal which is applied to the toggle input of the flip-flop. The flip-flop 564 toggles out of phase with the flip-flop 562.

When the flip-flop 562 finally toggles into its ultimate cleared state, the flip-flop 564 remains in a set state for one horizontal scanning interval and is then cleared by a SYNC pulse. It is during this horizontal scanning interval that the vertical counter is adjusted in the manner described above. The normal and the delayed SYNC pulses which would normally flow into the GAMMA signal are blocked by the flip-flop 564 which disables a gate 568 and which also supplies a disabling signal to the gate 572 through a gate 570 during alternate frames. Simultaneously, the flip-flop 564 partially enables a gate 586 through which 128 pulses are to pass during the first half of this horizontal scanning interval. The gate 586 is completely enabled during the first half of this horizontal scanning interval by an H-UP signal which is generated by the horizontal counter 600 while that counter counts from a count of 256 down to zero. The least significant count output from the horizontal counter 600 passes through gates 580, 584, 586 and 599 and into the GAMMA signal during this first half of a horizontal scan. In this manner, 128 extra pulses are added to the GAMMA signal. It is assumed for the moment that the ¾ OFF signal is high, and that a circular scan is to be generated.

It will be remembered that the vertical counter does not generate the least significant bit of the vertical count, but that this bit is provided by the flip-flop 566 shown in FIG. 5C. Hence, each count in the GAMMA signal is equivalent to two vertical counts. In the above discussion, while it was stated that the vertical counter was initially loaded with the value 320, actually the counter itself was only loaded with the value 160. However, the value 320 was presented to the vertical compare 530, since an additional least significant bit is added at that point. When the ALPHA signal terminates, an actual count of 160 is stored within the vertical counter 500. 128 pulses from the least significant output of the horizontal counter 600 pass through the gates 580, 584, 586 and 599 and appear at the GAMMA signal which is the count input signal to the vertical 500. However, the operation of the flip-flop 596 generates the BETA signal which cancels out every other one of these GAMMA pulses by preventing them from passing through the gates 514 and 516 shown in FIG. 5A. Hence, the actual number of counts which reach the vertical counter during the first half of the horizontal scan following termination of the ALPHA signal is 64. Subtracting 160 from 164, this leaves an actual within the vertical counter at 96. However, since the count presented to the vertical compare 530 is effectively twice the actual value stored within the vertical counter, the effective vertical count at this point in time is 192 or 193.

At the end of this horizontal scanning interval, the flip-flop 564 clears and disables the gate 586 from passing any additional horizontal counter output pulses to the vertical counter. Pairs of SYNC pulses and delayed SYNC pulses are then permitted to pass out of the gate 578 to the input of the gate 597. However, the two flip-flops 592 and 594 delete one out of every four of the pulses applied to the input of the gate 597.

256 SYNC pulses are generated during the scanning of a single field. By delaying these pulses and adding them to themselves, 512 pulses appear at the output of the gate 578. The flip-flops 592 and 594 cancel out every fourth pulse and thus effectively limit the number of pulses which appear at the output of the gate 597 to 384 pulses. Hence, 384 pulses appear in the GAMMA signal during the scanning of a complete field. In the time it takes to scan one half of a field or for the vertical scan to reach the center of an image, 192 pulses appear in the GAMMA signal. Half of these pulses are deleted by the BETA signal generated by the flip-flop 596, and hence the actual number of counts which reach the vertical counter during the first half of a field is 96 pulses. This is precisely the number of pulses required to count the vertical counter down to zero count when an image is half scanned.

In summary, the vertical counter counts down from an effective initial count of 320 down to an effective count of 192 during a single horizontal scanning line and then counts down from an effective count of 192 to zero during the first half of the scan. It is thus possible for the vertical compare 530 (FIG. 1) to obtain a valid comparison between the vertical counter 500 output and the lever counter 400 output for any lever counter value between zero and 320. The V. COMP. generated by the vertical compare 530 then initiates operation of the vertical squarer 730 in the manner already explained.

If an elliptical wipe is to be generated rather than a circular wipe, a 3/4 OFF control signal is brought to a low potential. This signal causes the gate 590 to disable the flip-flop 592 and thus prevents the gate 597 from blocking the passage of pulses. This action disables the circuitry which deletes every fourth pulse. The 3/4 OFF signal also disables the gate 580 and enables a gate 582 to pass the second least significant output of the horizontal counter through the gates 584, 586 and 599 during the first half of the horizontal scan which follows termination of the ALPHA signal. The vertical counter is still set to an initial effective count of 320 or to an actual initial count of 160. After termination of the ALPHA signal, 64 pulses pass through the gates 582, 584, 586 and 599 and appear in the GAMMA signal. Half of these are deleted by the BETA signal generated by the flip-flop 596, and hence a count of 32 is subtracted from the count of 160 within the vertical counter. The vertical counter is left with an actual count of 128 that is equivalent to an effective count at the input to the vertical compare 530 of 256 or 257.

During the time it takes to vertically scan the first half of a field, 128 SYNC pulses pass into the vertical control 560 and 256 SYNC pulses and delayed SYNC pulses appear at the output of the gate 578. Since the gate 597 no longer deletes every fourth pulse, all 256 pulses pass through the gates 597 and 599 and appear in the GAMMA signal. The BETA signal generated by the flip-flop 596 then deletes every other one of these pulses and thus reduces the number of pulses which reach the vertical counter to 128. Hence, the counter counts from an initial value of 128 down to a value of zero when the scanning of a field is half completed. In this manner, an elliptical wipe effect is achieved.

When special effects other than circular special effects are being generated, the CIRCLE control signal is high. This signal is applied to the clear input of the flip-flop 564 in inverted form and prevents the flip-flop 564 from actuating the circuitry which subtracts pulses from the vertical counter during a horizontal line after the termination of the ALPHA signal. Hence, when other special effects are generated, the entire procedure described above for initiating the vertical counter is disabled and is not carried out.

HORIZONTAL COUNTER

FIG. 6A illustrates the details of the horizontal counter 600. In many respects, the horizontal counter circuitry is similar to the vertical counter circuitry 500 shown in FIG. 5A. Three counter stages 624, 626 and 628 are required, since the horizontal counter 600 generates a complete 9-bit count and does not omit the least significant bit as does the vertical counter 500. A bistable 604 controls the up/down operation of the horizontal counter 600 and functions in the same manner as the bistable 504 shown in FIG. 5A. The gates 608 and 610 are analogous to the gates 514 and 516 in FIG. 5A and are alternately enabled by the bistable 604 to pass pulses from the 8 megacycle H. CLOCK signal to either the up or the down input of the counter 600 proper. Whether the horizontal counter 600 initially counts in an upwards direction or in a downwards direction is determined by an H. DWN. signal. This signal initially sets or clears the bistable 604 by enabling one of the gates 602 or 612 during each horizontal retrace period to pass an H. PRESET pulse. The H. PRESET signal is analogous to the ALPHA signal shown in FIG. 5A and not only determines which way the counter 500 counts initially, but also loads a numeric value into the counter. The counter is initially loaded with either the value 0 or 256 depending upon the state of a 0–512 control signal. When the counter 600 reaches zero count, a zero detection circuit 616 generates an H.

ZERO signal which causes a one-shot multivibrator 622 to generate a pulse. An inverted output of the multivibrator 622 disables the down counting gate 610 during one H. CLOCK pulse and simultaneously a non-inverted output of the multivibrator 622 enables the same H. CLOCK pulse to pass through a gate 606 and to reset the bistable 604 so that the counter 600 begins to count in an upwards direction. The least significant output bit of the counter is not included in the zero detection process. Hence, when the horizontal counter counts down to a count of one, the direction reverse circuitry is placed in operation. One counting pulse is skipped, with the count remaining at one, and the count then commences upwards from a count of one.

When circular special effects are generated, the CIRCLE control signal enables a gate 620 to pass an inhibiting signal from the multivibrator 622 to the gate 608 so as to inhibit one upward counting pulse from reaching the counter 600. This refinement was found to be desirable in order to keep the horizontal counter 600 properly synchronized with the horizontal squarer.

Provision is made whereby the horizontal counter may change from an upward counting counter to a downward counting counter when a particular count is reached. The most significant bit output of the counter 600 is fed back through a gate 618 and is used to reset the bistable 604 to a downward counting direction when a count of 256 is reached. However, when certain triangle special effects are generated, it is desirable to allow the counter to advance beyond 256. An H. TRI. control signal may disable the gate 618 and also the zero detection gate 616 and thereby allow the horizontal counter 600 to count beyond both 256 and 0. A 32-count output from the counter stage 626 is fed through a gate 604 and resets the bistable 604 whenever an H. MULT. (horizontal multiple effect) control signal is at a low level. Resetting of the horizontal counter at a count of 32 causes multiple horizontal effects to be generated and to be spaced horizontally from one another across the video image. Other count values may also be selected and used to reset the counter 600, and other special effects may thus be obtained.

DIAGONAL ADDER AND HORIZONTAL COMPARATOR

The horizontal and diagonal adder 680 and the horizontal comparator 650 appear in FIG. 6B. The comparator 650 appears slong the center line of FIG. 6B and includes three stages 652, 654 and 656 which function in the same manner as the two stage comparator shown in FIG. 5B. The output of the horizontal counter 600 is fed into the upper portions of the comparator 650. At the bottom of FIG. 6B a full binary adder comprising the three adder stages 682, 684 and 686 is shown. These three adder stages comprise the diagonal adder 680 shown in FIG. 1. The output signals from the lever counter are fed into the adder inputs A and the outputs from the vertical counter are fed into the adder inputs B. As in the case of the comparator 530 shown in FIG. 5B, the least significant digit of the vertical count is a special SQ. INT. signal which is generated in FIG. 5B. This signal is explained in connection with the description of FIG. 5B.

All other components shown in FIG. 6B are used to produce various special effects. For example, the four most significant bits of the horizontal count output are fed into the horizontal comparator 650 through a full adder circuit 658 which includes provision for adding a MULT. DIAMOND (multiple diamonds) signal to the horizontal count signal line number 5 and for adding a DIAMOND signal to the horizontal count signal line number 8. A carry signal output from the adder 658 passes through a gate 660 on its way to the horizontal comparator 650. This carry signal is cut off whenever the control signal 512 is at ground level. This signal 512 is is used to prevent a count of 512 from being reached by the horizontal counter whenever that is desirable.

The first comparator stage 652 may be turned off by an H. COMP. 1 OFF signal. By disabling this comparator stage, the line of separation between image segments is given a pinking shears or staircase edge effect which cannot be achieved by analog special effect generators. An H. BIT 6 OFF signal disables one input to the comparator 654 and produces an interesting special effect in which the line of separation between image segments are discontinuous and jump around in an animated way in response to actuation of the lever control. It may be seen that a wide variety of different effects may be achieved by using different combinations of control signals.

HORIZONTAL SQUARER

The horizontal squarer 700 is shown in FIG. 7A. Except for the number of stages involved, the horizontal squarer 700 is essentially identical to the squarer shown in FIG. 10D. The input elements 702 and 704 which separate the horizontal count signals from the inputs to the binary full adders 706 and 708 are 4-bit true/complement elements which reverse the sign of the horizontal count under the control of an H. UP (horizontal up count) signal which is generated by the bistable 604 shown in FIG. 6A. The purpose of the elements 702 and 704 is to determine which of the above equations ii or iii is to be implemented in dependence upon whether the horizontal counter is counting in an upwards or a downwards direction.

The same H. UP signal is used to control whether the horizontal square counters 710 and 712 count in an upwards or in a downwards direction. A flip-flop 714 accepts the carry output of the full adder 708 and generates normal and inverted inputs for the serially connected counters 710 and 712. The latch for the horizontal squarer comprises flip-flops 716, 718, 720, 722, 724, 726, 728 and 729.

Because of the extremely high frequency at which the horizontal squarer 700 operates, it is necessary to supply clocking pulses to different portions of the horizontal squarer 700 and to the horizontal counter 600 at different moments in time. The series of inverting gates shown at the bottom of FIG. 7A introduce time delays into the 8 M.C. (8 megacycle) signal and determine when the signal reaches differing sections of the latching flip-flops 716 through 729 and the flip-flop 714 which drives the counter stages 710 and 712. An H. CLOCK signal derived from the series of inverters is applied to the horizontal counter 600 at the proper times so as to synchronize the operation of the horizontal counter 600 and the horizontal squarer 700 at an 8 megacycle rate of operation.

VERTICAL SQUARER

Figure 7C:
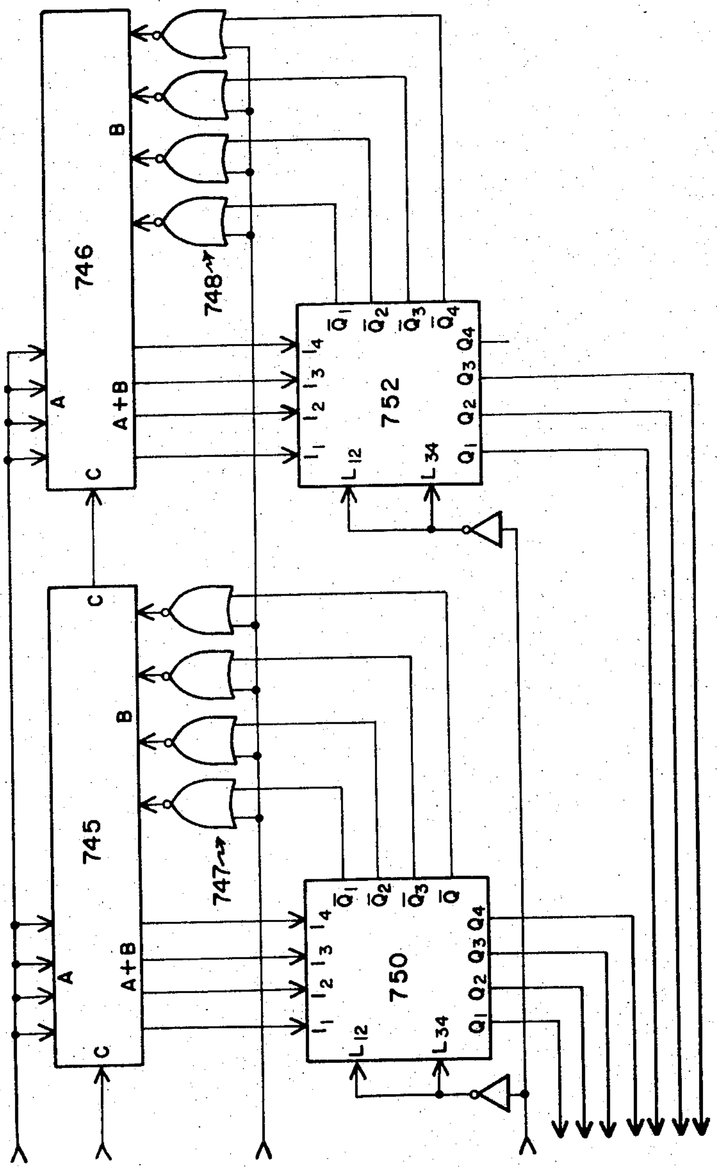

The vertical squarer 730 is shown in FIGS. 7B and 7C which are to be assembled into a single figure in the manner illustrated in FIG. 7D. The vertical squarer 730 is wired in a similar manner to the squaring circuit shown in FIG. 10D except that in place of the $Y^2$ counter 1032 in FIG. 10D additional adder and $Y^2$ register stages are included.

The vertical squarer 730 includes four binary full adders 735, 736, 745 and 746. An input A to the least significant adder stages 735 and 736 is connected to the vertical counter output signals through a pair of true/-complement elements 731 and 732 which reverse the sign of the vertical count under the control of the V. UP signal (generated by the bistable 504 shown in FIG. 5A). Again, the purpose of these complementing circuits is to determine which of the above two equations ii or iii is implemented in accordance with whether the vertical counting direction is up or down. Integrated circuit latches 737, 738, 750 and 752 are used to store the computed vertical square count and are analogous to the $Y^2$ register 1030 shown in FIG. 10D.

The vertical squarer 730 is supplied with timing pulses which are derived from the GAMMA signal delayed by a pair of one-shot multivibrators 739 and 740. The one-shot multivibrator 739 determines the amount of delay, and the multivibrator 740 determines the pulse width. This pulse is applied to the latches 737, 738, 750 and 752 just as a timing pulse is applied to the $Y^2$ register 1030 shown in FIG. 10D. The nondelayed GAMMA pulses are applied to the vertical counter itself, just as a timing pulse is applied to the Y counter 1026 in FIG. 10D.

The least significant digit of the vertical square output is assumed to be equal to the least significant digit of the vertical count. Most conveniently, this least significant digit is derived from the BETA signal generated by the flip-flop 596 shown in FIG. 5C in response to GAMMA pulses.

As has already been explained, the vertical squarer 730 is prevented from functioning until the vertical count equals the lever count as determined by the vertical comparator 530 shown in FIG. 5B. To prevent the vertical squarer 730 from functioning before that time, an output signal is developed by a gate 741 which disables the input gates 743, 744, 747 and 748 to the B inputs of the full adders 735, 736, 745 and 746 and which also passes through a gate 734 and forces a zero output from the true/complement elements 731 and 732. With zero inputs applied to the full adders, the GAMMA pulses cause zero values to be initially loaded into the latches 737, 738, 750 and 752.

The gate 741 is disabled during the vertical retrace period by a high level ALPHA signal. At the start of a field scan, the gate 741 is partially enabled by the low level ALPHA signal and by the CIRCLE control signal which is assumed to be present (at a low level) during the generation of circular or elliptical special effects. The V. COMP. signal generated by the vertical comparator remains at a low level until the vertical counter counts down to equality with the lever counter. When the vertical counter and the lever counter present the same count value, the V. COMP. signal goes high and causes the output of the gate 741 to go high. The gate 734 is then enabled to pass the V. UP signal to control the true/complement elements 731 and 732. The gate 733 is disabled from forcing a zero count at the output of the true/complement elements. The gates 743, 744, 747, and 748 are enabled by a low level signal input to connect the outputs of the latches 737, 738, 750 and 752 into the B inputs of the full adders 735, 736, 745 and 746. In this manner, the vertical squarer 730 is placed into operation with an initial output of zero when the vertical count and the lever count are equal to one another.

CIRCLE COMPARATOR

The circle comparator 760 is shown in FIG. 7E. Except for its having an increased number of stages, the circle comparator 760 is essentially identical in structure to the vertical comparator shown in FIG. 5B. A C. COMP. signal is generated by the comparator which indicates whether the horizontal squarer output or the vertical squarer output is greater in magnitude.

The control signals shown entering FIG. 7E are to produce various miscellaneous special effects. For example, a 1, 2 OFF control signal disables the first two comparator stages 762 and 764 and thus reduces the resolution of the circular comparator to give a staircase or pinking shears appearance to the resultant double image. A 3 OFF control signal disables the comparator stage 766. A GEAR control signal disables the gate 770 and prevents the 13th vertical square terminal from reaching the comparator stage 766. This GEAR control signal causes a series of horizontally directed notches to appear around a circular special effect which somewhat resemble the teeth of a gear. It is to be understood that it is difficult to describe with words the various special effects which may be generated by the use of the special control signals such as those just described. Some of the special effects tend to be quite animated. Since any desired combination of the control signals may be used to achieve an interesting effect, numerous different effects may be generated. Similar modifications of the comparison circuitry may be made in other ways to achieve other desirable special effects.

OUTPUT SWITCH

The output switch 800 appears in FIG. 8A. The output switch 800 accepts the comparison signals from the horizontal, the vertical, and the circle comparators 650, 530 and 760 and selects one or more of these comparison signals for use in controlling the video switches shown in FIG. 11A. A POLARITY control signal is provided to reverse the sign of the resultant composite comparison signals. The POLARITY control signal gives one control over which direction of a wipe is to be the normal direction and which is to be the reverse direction.

The three comparison control signals are each applied to the inputs of a single gate 816. The output of the gate 816 is then passed either in normal or inverted form on to the circuitry shown in the lower half of FIG. 8A by whichever of the gates 820 or 818 is enabled by the POLARITY control signal. The C. COMP. signal from the circular comparator passes through a gate 814 to the gate 816. The H. COMP. signal from the horizontal comparator 650 passes through one or the other of a pair of gates 806 or 808 in accordance with the sign of the POLARITY signal and through a gate 812 under the control of an HORIZ. signal. The V. COMP. signal from the vertical comparator 530 passes through one or the other of a pair of gates 802 or 804 depending upon the state of the POLARITY signal and through a gate 810 under the control of a VERT. control signal. Hence, the particular comparison signal or signals reaching the gate 816 is determined by the control signals VERT., HORIZ., and POLARITY. A separate control signal for the C. COMP. signal may also be provided, if desired.

Whichever comparison signal or combination of comparison signals are selected, the resultant switching signal is fed through one of the two gates 822 or 824; through the gates 826, 828 and 830; through a compensated amplifier 832; through a limiting amplifier 834; and on to the video switches shown in FIG. 11A. Depending upon which of the gates 822 or 824 is enabled by the N/R signal, the switching signal is either passed through the gate 826 in normal form or in inverted form. It will be remembered that the signal N/R is generated in dependence upon whether the wipe is to be in the normal or in the reverse direction.

When the lever control is positioned at either end of its range, the A and B signals program the output switch 800 to continuously generate an output which is either high or low and which does not fluctuate. The limit switch signals A and B are fed into the gates 828 and 830.

A BLANK signal derived from an input video blanking signal is fed into the gate 828 to force the selection of synchronizing pulses from only one of two video input signals and to prevent any switching from occurring during horizontal or vertical retrace intervals.

OUTPUT POLARITY CONTROL

The output polarity control 850 is illustrated partly schematically and partly logically in FIG. 8B.

Pulses generated by the A and B limit switches 102 and 103 in FIG. 1 are passed through limit switch interface amplifiers 852 and 854 where these pulses are first filtered and then amplified into clean switching signals. The limit switch signals are applied to the inputs I1 and I2 of a two-bit latch or storage device 862 which is pulsed during each vertical retrace interval by a HOLD signal. The outputs of the two-bit latch 862 are the A and B signals which are high only when the corresponding limit switches 102 and 103 are actuated by the lever control 101. These A and B output signals are fed to the output switch 800 and has been explained.

The direction in which a particular special effect proceeds is determined by a bistable 872 which generates the N/R signal. As has already been explained, the N/R signal programs the special effects generator to wipe either from a signal A to a signal B, or from a signal B to a signal A, depending upon its state. With reference to FIG. 1, the switches 104, 105 and 106 are normally closed. These switches open whenever one of them is depressed. The buttons may be interlocked, if desired, so that only one of the push buttons can be depressed at any given moment and so that when another is depressed, the one previously depressed is released. Two of the signals, NORMAL, REVERSE AND NORM-/REV. are high at any given moment, and the third is low. These signals are processed by a non-inverting push button interface circuit 856, 858 and 860 which filters, amplifies, and limits the signals.

When the NORMAL push button is depressed, the NORMAL signal enables a pair of gates 864 and 866 which allow the A and B signals to set the bistable 872. In response to the A signal, the bistable 872 commences generating the N/R signal, while in response to the B signal, the bistable 872 terminates generating the N/R signal. When the REVERSE push button is depressed, the REVERSE signal enables a pair of gates 868 and 870 to connect the signals A and B in the reverse manner to the bistable 872 so that the signal B now starts the N/R signal and the signal A terminates the N/R signal. The NORM/REV. push button 106 causes the bistable 872 to be locked in that state in which it continuously generates the N/R signal so that a wipe from A to B proceeds in one direction and a wipe from B to A proceeds in the reverse direction.

CONTROL SIGNALS

The control signals which are used to program the digital special effects generator 100 are shown in FIG. 9. Each of these control signals, with the exception of the four shown at the bottom of FIG. 9, is connected to a positive source of potential by a resistor 912 and to one terminal of any desired number of single pole — single throw switches 910 by programming diodes 914. The switches 910 have their other terminals grounded. Whenever one of the switches 910 is actuated, a select group of the control signals are clamped to ground potential, and the digital special effects generator is programmed to produce a particular special effect. The arrangement of programming diodes required to generate seven illustrative effects is shown in FIG. 9, but is to be understood that many, many more effects may be achieved by using different combinations of diodes 914 and by adding additional switches 910. Hence, the particular special effects the generation of which is shown in FIG. 9 are to be considered merely illustrative of the many possible special effects which may be generated.

With reference to the bottom of FIG. 9, a number of the control signals are combined by logic gates 902, 904, 906 and 908 to cause generation of the control signals 32, 64, 256 and 320 which program the lever counter 400 shown in FIG. 4A. The purpose of the logic gates shown at the bottom of FIG. 9 is to make it possible for any desired control signal in the upper portion of FIG. 9 to cause the generation of any of the special lever counter control signals shown at the bottom of FIG. 9.

The gate 902 normally generates a control signal 256. However, if any of the control signals 32, 64, 320, 512 or 1024 are present, the generation of the signal 256 is terminated. Many special effects require a lever count of 256, and hence the gate 902 selects this count valve if none other is selected. Circular special effects require a lever count of 320, and hence the CIRCLE control signal is connected directly to the 320 control signal. A simple vertical wipe effect requires a lever counter count of 32 which is generated by the gate 906 in response to the VERT. control signal. A lever count of 64 is required for the generation of certain diagonal wipes and is generated in response to the control signal DIAG. When both the H. MULT. and V. MULT. signals are simultaneously present, the gates 904 and 906 are disabled and the gate 902 is allowed to select a lever count of 256. In any given embodiment of the invention, it is quite likely that gates additional to the gates 902, 904, 906 and 908 may be required to achieve any given special effect or combination of special effects.

While there has been described a preferred embodiment of the present invention, it is to be understood that numerous modifications and changes will occur to those skilled in the art. It is therefore intended by the appended claims to encompass all such modifications and changes as come within the true spirit and scope of the invention.

What is claimed as new and desired to be secured by Letters Patent of the United States is:

1. A video special effects generator for controlling the combining of video input signals into a video output signal under the control of horizontal and vertical synchronizing signals, said generator comprising:

a manually actuatable control;

conversion means connected to said control for generating a first digital representation of the position of the control;

means to which horizontal synchronizing signals are supplied for generating a second digital representation the magnitude of which corresponds to the time which has elapsed since the most recent horizontal synchronizing signal;

means to which vertical synchronizing signals are supplied for generating a third digital signal representation the magnitude of which corresponds to the time which has elapsed since the most recent vertical synchronizing signal;

digital signal comparison means having two signal inputs for generating an output signal the state of which depends upon the relative magnitude of the digital signal representations which are applied to the signal inputs;

video switching means for switching the video input signals into the video output signal under the control of the output signal generated by the digital signal comparison means;

means for generating the square of a digital representation interposed between the second and third digital representations and the digital comparison means; and second comparison means having inputs connecting to said first and one of said second or third digital signal representations for generating a second output signal the state of which depends upon the relative magnitudes of the digital signal representations which are applied to the inputs, said second output signal causing the square generating means which is connected to the same one of said second or third digital signal representations to commence generating the difference between the square of said one digital signal representation and the square of said first digital signal representation.

2. A digital special effects generator in accordance with claim 1 wherein the means for generating said one of said second or third digital signal representations begins counting at a preset value and initially counts at a high rate of speed compared to its normal counting rate.

3. A video special effects generator for controlling the combining of video input signals into a video output signal under the control of horizontal and vertical synchronizing signals, said generator comprising:

a manually actuatable control;

conversion means connected to said control for generating a first digital representation of the position of the control;

means to which horizontal synchronizing signals are supplied for generating a second digital representation the magnitude of which corresponds to the time which has elapsed since the most recent horizontal synchronizing signal;

means to which vertical synchronizing signals are supplied for generating a third digital signal representation the magnitude of which corresponds to the time which has elapsed since the most recent vertical synchronizing signal;

digital signal comparison means having two signal inputs for generating an output signal the state of which depends upon the relative magnitude of the digital signal representations which are applied to the signal inputs;

video switching means for switching the video input signals into the video output signal under the control of the output signal generated by the digital signal comparison means;

means for generating the square of a digital representation interposed between the second and third digital representations and the digital comparison means; and second comparison means having inputs connecting to said first and third digital signal representations for generating a second output signal the state of which depends upon the relative magnitudes of the digital signal representations which are applied to the inputs, said second output signal causing the square generating means which connects to said third digital signal representation to commence generating the difference between the square of the third and first digital signal representations.

4. A digital special effects generator in accordance with claim 3 wherein the square generating means each comprise a storage register having an output connected to the first comparison means and having an input, an adder having a first input connected to a digital representation, a second input connected to the output of said register, and an output connected to the input of said register, and wherein the square generating means interposed between the second digital representation and the comparison means includes means for keeping the storage register at an initial count until the second output signal indicates a particular relationship between the first and third digital representations.

5. A digital special effects generator in accordance with claim 3 wherein the means for generating said third digital signal representations begins counting at a preset value and, at the onset of a video field, counts at a high rate of speed compared to its counting rate during the remainder of the field.

6. A digital special effects generator in accordance with claim 5 wherein the square generating means each comprise a storage register having an output connected to the first comparison means and having an input, an adder having a first input connected to a digital representation, a second input connected to the output of said register, and an output connected to the input of said register, and wherein the square generating means interposed between the second digital representation and the comparison means includes means for keeping the storage register at an initial count until the second output signal indicates a particular relationship between the first and third digital representations.

7. A circular and elliptical special effects generator comprising:

a first counter arranged to count from an initial value to zero and then to a final value during each horizontal scan;

a second counter arranged to count from an initial value to zero and then to a final value during each vertical scan;

first comparison means for comparing the output of said second counter to a digital value and for generating a first control signal when the second counter output passes the digital value;

first square generating means connected to the first counter and including an adder and a storage register for continuously computing the square of the first counter output and initially primed with the square of the first counter initial value;

second square generating means connected to the second counter and including an adder and a storage register for continuously computing the difference between the square of the digital value and the square of the second counter output;

means for clamping the storage register in said second square generating means at zero output value until the onset of the first control signal;

second comparison means for comparing the respective outputs of said first and second square generating means and for generating a second control signal representing the result of the comparison;

and video switching means for switching video signals in accordance with the state of the second control signal.

8. A special effects generator for generating circular and elliptical wipe effects and including means for presenting numbers proportional to the horizontal and vertical position of a video scan at any moment in time and an additional number proportional to the size of the desired special effect configuration, said generator comprising:

means for continuously generating the square of the number representing the horizontal scanning position plus an arbitrary constant which may be zero;

means including a register for generating within the register a number proportional to the square of the number representing the vertical scanning position plus an arbitrary constant;

a comparator for signaling when said number representing the vertical scanning position is equal to said number representing the size of the desired special effect configuration;

means actuated by said comparator for clearing said register to zero, thereby forcing the arbitrary constant that is added to the square of the number representing the vertical scanning position to equal minus the square of the number proportional to the size of the desired special effect; and means for presenting one of two video input signals as a video output signal in accordance with whether the square of the number representing the horizontal scanning position plus an arbitrary constant is greater than or less than the square of the number representing the vertical scanning position plus the arbitrary constant.

* * * * *